US 8,547,107 B2

(12) United States Patent
Abe et al.

(10) Patent No.: US 8,547,107 B2
(45) Date of Patent: Oct. 1, 2013

(54) SELF-DIAGNOSTIC APPARATUS FOR ELECTRICAL STORAGE SYSTEM

(75) Inventors: Takayoshi Abe, Moriguchi (JP); Takeshi Nakashima, Moriguchi (JP); Hayato Ikebe, Moriguchi (JP); Hiroki Nakatsu, Osaka (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 13/427,314

(22) Filed: Mar. 22, 2012

(65) Prior Publication Data

US 2012/0235687 A1 Sep. 20, 2012

Related U.S. Application Data

(63) Continuation of application No. PCT/JP2011/073551, filed on Oct. 13, 2011.

(30) Foreign Application Priority Data

Oct. 15, 2010 (JP) ................................. 2010-233140

(51) Int. Cl.
*G01R 31/02* (2006.01)
(52) U.S. Cl.
USPC ........... 324/537; 324/426; 324/427; 324/433; 320/134; 320/120; 320/128; 320/136; 320/165; 307/64; 307/65; 307/66
(58) Field of Classification Search
USPC ........................................................ 324/537
See application file for complete search history.

(56) References Cited

U.S. PATENT DOCUMENTS

| | | | | |
|---|---|---|---|---|
| 6,075,344 A | * | 6/2000 | Kawai | 320/134 |
| 6,424,158 B2 | * | 7/2002 | Klang | 324/433 |
| 2009/0009143 A1 | * | 1/2009 | Odaohhara | 320/162 |
| 2009/0085516 A1 | * | 4/2009 | Emori et al. | 320/118 |
| 2010/0194354 A1 | * | 8/2010 | Gotou et al. | 320/163 |
| 2011/0090726 A1 | * | 4/2011 | Brotto et al. | 363/131 |
| 2011/0313613 A1 | * | 12/2011 | Kawahara et al. | 701/29 |
| 2012/0175953 A1 | * | 7/2012 | Ohkawa et al. | 307/18 |

FOREIGN PATENT DOCUMENTS

| | | | |
|---|---|---|---|
| JP | 11-136867 A | | 5/1999 |
| JP | 2001-16786 A | | 1/2001 |
| JP | 2009-72053 A | | 4/2009 |
| JP | 02010140785 A | * | 6/2010 |
| JP | 2010-148252 A | | 7/2010 |

OTHER PUBLICATIONS

International Preliminary Report on Patentability for International Application No. PCT/JP2011/073551, issued May 8, 2013, with English translation.

* cited by examiner

*Primary Examiner* — Arleen M Vazquez
*Assistant Examiner* — Thang Le
(74) *Attorney, Agent, or Firm* — Cantor Colburn LLP

(57) ABSTRACT

A startup self-diagnostic apparatus for an electrical storage system including an electrical storage device, a charge and discharge switch device disposed to be connected to the electrical storage device, an electrical storage device breaker disposed between the electrical storage device and the charge and discharge switch device, and a load side breaker disposed between the charge and discharge switch device and an external load comprises a state monitoring unit for the electrical storage device breaker, a state monitoring unit for the load side breaker, a converter diagnosing unit, a switching device diagnosing unit, and an electrical storage device monitoring unit, for diagnosing peripheral diagnostic items which may be diagnosed without using the electrical storage device.

10 Claims, 19 Drawing Sheets

| CHECKED | |
|---|---|
| BRING ELECTRICAL STORAGE DEVICE BREAKER INTO CONNECTED STATE ? | |

FIG. 10

| CHECKED | |
|---|---|
| BRING LOAD SIDE BREAKER INTO CONNECTED STATE? | |

FIG. 11

| ABNORMAL STATE | |
|---|---|
| > PLEASE TURN OFF POWER<br>　　A01 ／ 03　　　　03−01−003<br>　　B01 ／ 01　　　　01−03−001 | |

FIG. 12

| PERIODICALLY MONITORED OBJECT | REQUIREMENTS FOR DETERMINING ABNORMALITY | | FAULT STATE | RESTORABLE ABNORMAL STATE |
|---|---|---|---|---|
| ELECTRICAL STORAGE DEVICE | BATTERY STATE | OVERDISCHARGED | ○ | |
| | | OVERCHARGED | ○ | |
| | | FULLY CHARGED | | ○ |
| | ABNORMAL BATTERY TEMPERATURE | | ○ | |
| CHARGE AND DISCHARGE SWITCH DEVICE | ABNORMAL CHARGING CURRENT VALUE | | | ○ |
| | ABNORMAL DISCHARGING CURRENT VALUE | | | ○ |
| | CONTINUATION OF ABNORMAL CHARGING OR DISCHARGING CURRENT VALUE FOR PREDETERMINED PERIOD | | ○ | |
| | ABNORMAL CHARGE SWITCH ON VOLTAGE | | ○ | |
| | ABNORMAL CHARGE SWITCH OFF CURRENT | | ○ | |
| | ABNORMAL DISCHARGE SWITCH ON VOLTAGE | | ○ | |
| | ABNORMAL DISCHARGE SWITCH OFF CURRENT | | ○ | |

| | STARTUP SELF-DIAGNOSIS | | PERIODIC MONITORING DURING OPERATIONS |
|---|---|---|---|
| | INTERRUPTION OF LOAD SIDE BREAKER | ABSENCE OF LOAD SIDE BREAKER (LOAD CONNECTION) | |
| DETERMINATION OF ACTION RESPONDING TO ON COMMAND | VOLTAGE DIFFERENCE BETWEEN $V_{74}$ AND $V_{30}$ IS WITHIN PREDETERMINED RANGE: NORMAL OUT OF PREDETERMINED RANGE: ABNORMAL | ↓ | ↓ |
| | UNDETERMINED FROM $I_{74}$ | ↓ | ↓ |
| DETERMINATION OF ACTION RESPONDING TO OFF COMMAND ACTION | $V_{74}$ IS IN PREDETERMINATION MEASUREMENT ERROR RANGE OF 0 : NORMAL $V_{74} = V_{30}$ : ABNORMAL | $V_{74} \neq V_{30}$ : NORMAL NOT NECESSARILY ABNORMAL EVEN WHEN $V_{74} = V_{30}$ | UNDETERMINED FROM $V_{74}$, $V_{30}$ |
| | UNDETERMINED FROM $I_{74}$ | AND $I_{74} \neq 0$ : ABNORMAL $I_{74} = 0$ : NORMAL | $I_{74} = 0$ : NORMAL $I_{74} \neq 0$ : ABNORMAL |

| | | BASIC STATE | | |
|---|---|---|---|---|
| | | CHARGE AND DISCHARGE | CHARGE ONLY | DISCHARGE ONLY |
| CHARGE AND DISCHARGE SWITCH DEVICE | CHARGE ON/OFF | ON (CHARGING) | ON (CHARGING) | OFF |
| | DISCHARGE ON/OFF | ON (DISCHARGING) | OFF | ON (DISCHARGING) |
| ELECTRICAL STORAGE BREAKER | CONNECTED/ INTERRUPTED | CONNECTED (ENERGIZED) | CONNECTED (ENERGIZED) | CONNECTED (ENERGIZED) |
| SWITCHING DEVICE | SERIES/PARALLEL CONNECTION | PARALLEL | PARALLEL | SERIES |
| AC/DC CONVERTER | OUTPUT ON/OFF | OFF | ON | OFF |
| OPERATION LAMP | LIGHT ON/OFF | LIGHT ON | LIGHT ON | LIGHT ON |
| ERROR LAMP | LIGHT OFF/ON | LIGHT OFF | LIGHT OFF | LIGHT OFF |

FIG. 19

| | | STANDBY STATE |
|---|---|---|
| CHARGE AND DISCHARGE SWITCH DEVICE | CHARGE ON/OFF | OFF |
| | DISCHARGE ON/OFF | OFF |
| ELECTRICAL STORAGE DEVICE BREAKER | CONNECTED/ INTERRUPTED | CONNECTED (ENERGIZED) |
| SWITCHING DEVICE | SERIES/PARALLEL CONNECTION | SERIES |
| AC/DC CONVERTER | OUTPUTT ON/OFF | ON |
| OPERATION LAMP | LIGHT ON/OFF | LIGHT ON |
| ERROR LAMP | LIGHT OFF/ON | LIGHT OFF |

FIG. 20

SELF-DIAGNOSTIC APPARATUS FOR ELECTRICAL STORAGE SYSTEM

CROSS-REFERENCE TO RELATED APPLICATION

The present application is a continuation application of International Application No. PCT/JP2011/073551, filed Oct. 13, 2011, the entire contents of which are incorporated herein by reference and priority to which is hereby claimed. The PCT/JP2011/073551 application claimed the benefit of the date of the earlier filed Japanese Patent Application Nos. JP2010-233140, filed Oct. 15, 2010, the entire contents of which are incorporated herein by reference, and priority to which is hereby claimed.

TECHNICAL FIELD

The present invention relates to a self-diagnostic apparatus for an electrical storage system, and more particularly to a self-diagnostic apparatus for an electrical storage system in which the electrical storage system including a multiplicity of components in addition to an electrical storage device is self-diagnosed at startup time.

BACKGROUND ART

Use of electrical storage devices such as secondary batteries contributes to effective use of energy. In recent years, for example, photovoltaic power generation systems have been actively developed as environmentally-friendly clean energy. However, photoelectric conversion modules for converting solar light into electric power, which usually have no electrical storage function, are sometimes used in combination with secondary batteries. Effective utilization of energy is made, for example, by charge and discharge control for charging the secondary batteries with electric power generated by the photoelectric conversion modules while discharging the electric power from the secondary batteries in response to a request from an external load or the like.

When the electrical storage systems are thus constructed in combination with the secondary batteries and power sources to perform the charge and discharge control, it is desirable to monitor or diagnose any abnormality in the systems.

For example, Patent Document 1 discloses, as an electrical storage system using a secondary battery such as a lithium ion secondary battery, a structure including a self-diagnostic means that checks the presence or absence of an abnormality inside the electrical storage system, a means that measures a voltage across terminals of the secondary battery, an electrical current passing through the battery, and a temperature related to the battery, a charge and discharge controlling means connected to a positive side charging line, a system controlling means, an inverter connected to the charge and discharge controlling means, and a communication means for devices that performs bidirectional communication with the devices to which electric power is supplied from the inverter. Here, it is described that after self-diagnosis, whether or not the voltage across terminals, the electric current, and the temperature show any abnormality is checked. When no abnormality is found and discharging is allowed, whether or not to perform discharge is checked. Then, when discharging is determined, discharge processing is performed, or when discharging is not determined, it is checked whether or not to perform charge. When charging is determined, charge processing is performed.

Patent Document 2 describes a microcomputer for receiving a signal from a current sensing circuit to detect an amount of charge in an electrical storage system using 100 to 150 lithium ion secondary batteries, and a process of turning on a main switching element while turning off a start-up switching transistor when a voltage of each lithium ion secondary battery exceeds an overdischarge setting value. Further, it is also described that a bypass circuit is provided to prevent an overrun of a withstanding voltage from being caused by turning off the main switching element when the voltage of each lithium ion secondary battery exceeds the overdischarge setting value.

RELATED ART DOCUMENT

Patent Documents

Patent Document 1: Official Gazette JP H11-136867 A
Patent Document 2: Official Gazette JP 2009-72053 A

SUMMARY OF THE INVENTION

Problems to be Solved by the Invention

In a process of monitoring or diagnosing abnormality in an electrical storage system, an electrical storage device might be brought into an excessively charged state or an excessively discharged state due to an erroneously performed procedural step, or an electrical current that exceeds a rated current or the like might be fed to each of storage battery modules constituting the electrical storage device, which can cause damage to the electrical storage device.

The present invention is directed to provide a self-diagnostic apparatus for an electrical storage system capable of conducting startup self-diagnosis while preventing an electrical storage device from being damaged.

Means for Solving the Problems

In a self-diagnostic apparatus for an electrical storage system according to the present invention, the electrical storage system comprises an electrical storage device, a charge and discharge switch device disposed so as to be connected to the electrical storage device, and an electrical storage device breaker disposed between the electrical storage device and the charge and discharge switch device. Further, the self-diagnostic apparatus comprises a peripheral item diagnosing unit to diagnose peripheral diagnostic items after the electrical storage device breaker is brought into an interrupted state.

Effect of the Invention

According to the above-described structure, it is possible to prevent the electrical storage device from being accidentally damaged in a self-diagnostic stage of the electrical storage system conducted by the self-diagnostic apparatus for the electrical storage system.

BRIEF DESCRIPTION OF THE DRAWINGS

FIG. 10 is a diagram showing a display screen in a display unit indicating that the electrical storage device breaker becomes connectable in the embodiment of the present invention;

FIG. 11 is a diagram showing a display screen in the display unit indicating that the load side breaker becomes connectable;

FIG. 12 is a diagram showing a display screen in the display unit indicating contents of an error obtained as a result of diagnosis;

FIG. 14 is a diagram showing an example of classifying the detected abnormality in the periodic monitoring according to the embodiment of the present invention;

FIG. 16 is a diagram showing three cases related to determination of an operation of a discharge switch in the embodiment of the present invention;

FIG. 19 is a diagram for explaining requirements for setting the normal operation mode in the embodiment of the present invention;

FIG. 20 is a diagram for explaining requirements for setting the standby mode in the embodiment of the present invention;

MODE FOR CARRYING OUT THE INVENTION

Figure 1:
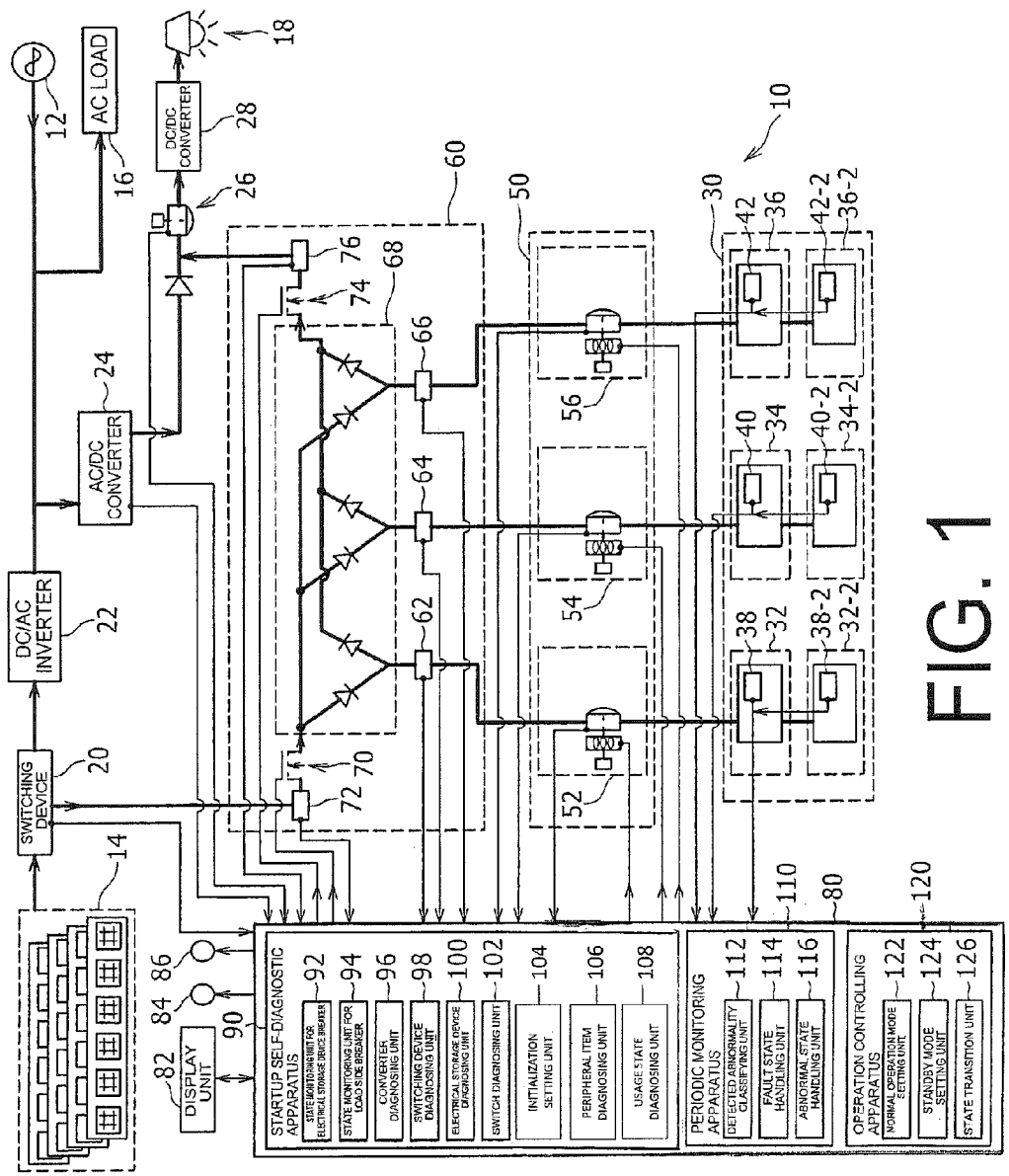
FIG. 1 is a diagram showing a configuration of an electrical storage system related to an embodiment of the present invention.

Hereinafter, an embodiment according to the present invention will be described in detail with reference to the drawings. It should be noted that a secondary battery such as a lithium ion secondary battery, a nickel hydride battery, or a nickel cadmium battery, may be used as a storage battery. The secondary battery is a battery that can be charged or discharged.

Further, although photovoltaically-generated power and external commercial power will be hereinafter described as a power source, other power sources such as wind-generated power may be used. Still further, the number of storage batteries constituting an electrical storage device, the number of photovoltaic power generation modules constituting a photoelectric conversion module for photovoltaic power generation, values of a voltage, a current, an SOC (State of Charge) or the like, which will be described below, are disclosed by way of illustration for explanation, and may be changed depending on specifications or other conditions of an electrical storage system, as appropriate.

Moreover, in the description below, similar components are identified by identical reference numerals in all drawings, and descriptions related to these components will not be repeated. Further, previously described reference numerals will be continuously described in context, as appropriate.

FIG. 1 is a drawing for explaining a configuration of an electrical storage system 10. The electrical storage system 10 comprises an electrical storage device 30, a load side breaker 26, an electrical storage device breaker 50, a charge and discharge switch device 60, and a control block 80. Further, in FIG. 1, components other than those of the electrical storage system 10 are also illustrated, including an external commercial power source 12 and a photoelectric conversion module 14 to be used as power supplies, an AC load 16 and a DC load 18 to be used as loads, and a DC/DC converter 28 for conversion into a direct current voltage suitable for the DC load 18. Hereinafter, an alternating current will be denoted as AC, while a direct current will be denoted as DC depending on the circumstances. Still further, thick solid lines indicate electric power flows, and thin solid lines accompanied with arrows indicate signal flows in FIG. 1.

The AC load 16, which is a device or the like driven with alternating current power, is a mechanical device such as, for example, a rotating electrical machine, an air conditioning unit, a processing machine, or an assembling machine. The DC load 18, which is a device or the like driven with direct current power, includes, for example, an office machine, a lighting device, etc. These are collectively referred to as external loads. The DC/DC converter 28 is a voltage convertor, for example, for converting direct current power of 96 V supplied from the electrical storage device 30 into direct current power of approximately 12 V suitable for the office machine and the like.

The external commercial power source 12 used as a source of electric power is a single-phase or three-phase alternating power source. The photoelectric conversion module 14 used as a source of electric power is a combination of a plurality of photovoltaic power generation modules, and implemented, in an example of FIG. 1, using four photovoltaic power generation blocks, each of which includes an arrangement of a plurality of photovoltaic power generation modules. The four photovoltaic power generation blocks are connected in parallel with each other. When six photovoltaic power generation modules arranged in each photovoltaic power generation block are connected in series, an output voltage of approximately 240 V can be obtained, while an output voltage of approximately 120 V can be obtained when, in each photovoltaic power generation block, three photovoltaic power generation modules arranged are connected in series with each other and the series-connected three photovoltaic power generation modules are further connected to another three photovoltaic power generation modules in parallel.

A switching device 20 is a connection switching device that functions to change a connected state of the plurality of photovoltaic power generation modules constituting the photoelectric conversion module 14, to thereby switch the output voltage between approximately 240 V and approximately 120

V. As the switching causes a change in the output voltage, the switching device 20 may be, from this aspect, referred to as a voltage switching device. Besides, in a broad sense, because the switching device 20 changes a power supply configuration and converts photovoltaically-generated power into 240-V direct current power or 120-V direct current power, it may be considered a form of a power supply converting device.

Further, the switching device 20 is capable of connecting the power generated by the photoelectric conversion module 14 to an inverter 22 side or the charge and discharge switch device 60 in an alternatively switchable manner.

When the photoelectric conversion module 14 is connected to the inverter 22 side, the power generated in the photovoltaic power generation modules can be supplied at a relatively high voltage to an inverter 22 by connecting the six photovoltaic power generation modules in series (a series connection form). In the series connection form, the photoelectric conversion module 14 is electrically disconnected from the charge and discharge switch device 60. On the other hand, when the photoelectric conversion module 14 is connected to the charge and discharge switch device 60, the power generated in the photovoltaic power generation modules can be supplied at a relatively low voltage to the charge and discharge switch device 60 by connecting the three photovoltaic power generation modules in series with each other and connecting the series connection of the three photovoltaic power generation modules in parallel with another series (a parallel connection form). In the parallel connection form, the photoelectric conversion module 14 is electrically disconnected from the inverter 22.

The switching device 20 is coupled to the control block 80 through a communication line, and is capable of switching between the series connection form and the parallel connection form according to a command from the control block 80, and transferring, to the control block 80, information as to which connection form is presently established. To supply the inverter 22 with power, the series connection form for outputting an operation voltage of approximately 240 V is established.

The inverter 22 is a power converter for converting direct current power into alternating current power, and may be considered a form of the power supply converting device in a broad sense. The inverter 22 can convert direct current power of approximately 240 V from the switching device 20 into alternating current power and supply the converted power to the AC load 16. In some cases, so-called power reversing to export power back into the external commercial power source or export power for power selling may be performed.

An AC/DC converter 24 is a power converter for converting alternating current power into direct current power, and may be considered a form of the power supply converting device in a broad sense. The AC/DC converter 24 converts, into direct current power as backup power, the alternating current power supplied from the external commercial power source 12 or converted by the inverter when no direct current power is supplied from the electrical storage device 30 to the DC load 18. For example, in a case where discharge is prohibited due to a decreased amount of charge in the electrical storage device 30 (when a below-described charge only state is established) or other cases, direct current power is supplied via the AC/DC converter 24 to the DC load 18.

As the AC/DC converter 24 is coupled to the control block 80 through a communication line capable of communicating digital data, settings of an operating condition, a command value of direct current power to be output (such as, for example, an output voltage value), and the like are transferred from the control block 80, while operating state data and the like is transferred the AC/DC converter 24 to the control block 80.

The load side breaker 26 is a power interrupting device disposed close to the DC load 18 between the electrical storage system 10 and the DC load 18. The load side breaker 26 can interrupt a flow of power when a current, which is of a predetermined interruption threshold or higher, is fed while direct current power from the electrical storage device 30 or other devices is being supplied via the DC/DC converter 28 to the DC load 18.

The load side breaker 26 may be of a manually-operated type, in which switching operation should be manually performed by a user to set an interrupted state from an energized state which is a connected state, or set the energized state from the interrupted state. The load side breaker 26 is connected to the control block 80 through a communication line for transferring a status signal, thereby allowing the control block 80 to know whether the load side breaker 26 is in the connected state or in the interrupted state. Although the load side breaker 26 may be of an automated type that is disconnected based on an interruption signal from the control block 80, the manually-operated type of the load side breaker 26 is more preferable to ensure protection of the DC load 18.

The charge and discharge switch device 60 is a charge and discharge switch device connected to the electrical storage device 30 for charging the electrical storage device 30 with electric power from the power source and discharging electric power from the electrical storage device 30 to an external load. Specifically, the charge and discharge switch device 60 is disposed, on a charging path side, between the switching device 20 and the electrical storage device 30, and disposed, on a discharging path side, between the load side breaker 26 and the electrical storage device 30.

The charge and discharge switch device 60 comprises a charge switch 70 on the charging path side, a discharge switch 74 on the discharging path side, and a group of diodes 68 for preventing backflow of a current switched between charge and discharge. Further, in order to detect a charged or discharged state, current/voltage detecting units 62, 64, and 66 are provided on an electrical storage device 30 side, a charge-side current/voltage detecting unit 72 is provided on a switching device 20 side of the charge switch 70, and a discharge-side current/voltage detecting unit 76 is provided on a load side breaker 26 side of the discharge switch 74.

The charge switch 70 and the discharge switch 74 are semiconductor switch elements to be turned on or off by an electrical signal, and may be embodied using FETs. The current/voltage detecting units 62, 64, 66, on the electrical storage device side, the charge-side current/voltage detecting unit 72, and the discharge-side current/voltage detecting unit 76 may be composed of voltage detecting sensors and current detecting sensors. It should be noted that because, in the electrical storage device 30, two storage battery packs (32 and 32-3; 34 and 34-2; 36 and 36-2) are series-connected to each other, and the series-connected battery packs are further parallel-connected in three rows as shown in FIG. 1, the current/voltage detecting units 62, 64, 66 on the electrical storage device side are correspondingly provided in the three rows, respectively. The number of storage battery packs constituting the electrical storage device 30 is not limited to six, and may be increased or decreased based on required power. It is, however, essential that the charging and discharging paths should be unified into the single charge and discharge switch device 60 for allowing the electrical storage system 10 to behave as being a single battery.

The charge switch 70 and the discharge switch 74 are connected to the control block 80 via a communication line through which charge and discharge commands are transferred. The charge and discharge commands from the control block 80 are provided using a LOW (0)/High (1) signal that represents turning the switch on/off. Each of the current/voltage detecting units 62, 64, 66 on the electrical storage device side, the charge-side current/voltage detecting unit 72, and the discharge-side current/voltage detecting unit 76 is connected to the control block 80 via a communication line capable of transferring analog data (for example, obtained by converting a detected amount into a voltage value of 1-5 V).

The electrical storage device breaker 50 can interrupt, as in the case of the load-side breaker 26, a flow of power when a current of the predetermined interruption threshold or higher is fed. The electrical storage device breaker 50 is disposed between the electrical storage device 30 and the charge and discharge switch device 60, and is composed of three breakers 52, 54, and 56 corresponding to a three row configuration of the electrical storage device 30. In FIG. 1, the breaker 52 is disposed on a row where the storage battery pack 32 and the storage battery pack 32-2 are connected in series, the breaker 54 is disposed on a row where the storage battery pack 34 and the storage battery pack 34-2 are connected in series, and the breaker 56 is disposed on a row where the storage battery pack 36 and the storage battery pack 36-2 are connected in series in a respectively corresponding manner.

The electrical storage device breaker 50 has a function of performing transmission to and receipt from the control block 80. The electrical storage device breaker 50 can switch from the connected state to the interrupted state according to a command from the control block 80. Further, the electrical storage device breaker 50 transfers a status signal indicating a present state being the connected state or the interrupted state to the control block 80. Both the command signal and the status signal are transmitted using LOW (0)/High (1) signals. Transfer of the signals is performed on a breaker by breaker basis for the breakers 52, 54, 56. Still further, the electrical storage device breaker 50 may be switched from the interrupted state to the connected state for energizing by manual switching operation of the user.

An assembled battery is formed by a combination of a plurality of secondary batteries arranged in series and in parallel, and is housed in one assembled battery case. A unit of the assembled battery case is referred to as the storage battery pack. The electrical storage device 30 is formed by connecting the storage battery packs 32 and the storage battery pack 32-2 in series with each other, connecting the storage battery pack 34 and the storage battery pack 34-2 in series with each other, connecting the storage battery pack 36 and the storage battery pack 36-2 in series with each other, and connecting the series-connected storage battery packs into three rows in parallel.

Storage battery state detecting unit 38, 38-2, 40, 40-2, 42, 42-2 is provided for each of the storage battery packs 32, 32-2, 34, 34-2, 36, 36-2 and is housed in the corresponding assembled battery case. Each storage battery state detecting unit has functions of detecting, as an internal state of each storage battery pack, a voltage between plus and minus terminals of the storage battery pack, a current flowing through the storage battery pack, a temperature inside the storage battery pack, etc. and transferring the internal state to the control block 80. In addition, the storage battery state detecting unit has further functions of detecting, as the internal state of each storage battery pack, abnormal states, such as a sensor abnormality, overcurrent, overdischarge, overcharge, and transferring the abnormal states to the control block 80. The storage battery state detecting units 38, 38-2, 40, 40-2, 42, 42-2 are connected to the control block 80 using a signal line capable of transferring the internal state of the storage battery pack as a digital signal. Each of the storage battery packs 32, 32-2, 34, 34-2, 36, 36-2 includes, in its assembled battery case, a variety of sensors such as the storage battery state detecting unit, and includes a transceiving circuit for transmitting and receiving signals detected by the sensors to and from an external device.

The control block 80 is a controller that functions to generally control each of the components of the electrical storage system 10 as a whole with respect to charge and discharge of the electrical storage system 10. A display unit 82 connected to the control block 80 is a compact-size display capable of displaying contents of errors and the like obtained when a self-diagnostic function, which will be described below, or other functions are performed. An operation lamp 84 is an indicating light that is lit when the electrical storage system 10 is in an operating condition. An error lamp 86 is an alarm indicating light that is lit when any abnormality occurs in the electrical storage system 10. Accordingly, while the electrical storage system 10 is operating normally, the operation lamp 84 is lit while the error lamp 86 is extinguished.

The control block 80 functions, as described above, to control general operation of the electrical storage system 10. The control block 80 comprises a startup self-diagnostic apparatus 90 for diagnosing whether or not each component is normal at startup time, a periodic monitoring apparatus 110 for periodically diagnosing whether or not each component is normal under the operating condition after startup, and an operation controlling apparatus 120 that has, as an operation mode, a normal operation mode and a standby mode, and controls a state transition between the modes.

The startup self-diagnostic apparatus 90 includes a state monitoring unit 92 for the electrical storage device breaker, a state monitoring unit 94 for the load side breaker, a converter diagnosing unit 96, a switching device diagnosing unit 98, an electronic storage device diagnosing unit 100, and a switch diagnosing unit 102, which are all used for diagnosing each state of the components. Details regarding each of the units will be described below.

The periodic monitoring apparatus 110 is composed of a detected abnormality classifying unit 112, a fault state handling unit 114, and an abnormal state handling unit 116. The detected abnormality classifying unit 112 classifies, when an abnormality is detected as a result of periodic monitoring, the detected abnormal state as an early recovery unforeseeable fault state or as a restorable abnormal state based on predefined classification criteria. When the detected abnormal state is classified as the early recovery unforeseeable fault state, the fault state handling unit 114 causes the electrical storage device breaker 50 to trip and outputs an alarm. When the detected abnormal state is classified as the restorable abnormal state, the abnormal state handling unit 116 outputs an alarm. Detailed explanation for each of the units will be described further below.

The operation controlling apparatus 120 is composed of a normal operation mode setting unit 122, a standby mode setting unit 124, and a state transition unit 126. The normal operation mode setting unit 122 establishes the normal operation mode for bringing both the electrical storage device breaker 50 and the load side breaker 26 into the connected states, and controlling operation of the charge and discharge switch device 60 depending on the state of charge while monitoring a charged state and the internal state of the storage battery device 30. The standby mode setting unit 124 establishes the standby mode for bringing both the electrical storage device breaker 50 and the load side breaker 26 into the connected states, and prohibiting operation of the charge and discharge switch device 60 to bring the charge and discharge switch device 60 into the interrupted state while continuing to monitor the charged state and the internal state of the storage battery device 30. The state transition unit 126 causes state transition between the normal operation mode and the standby mode. Detailed explanation for each of the units will be described further below.

The startup self-diagnosis performed by the startup self-diagnostic apparatus 90, the periodic monitoring performed by the periodic monitoring apparatus 110, and operation control performed by the operation controlling apparatus 120 may be implemented by executing software. For example, they can be implemented by creating a program in which a startup self-diagnostic program, a periodic monitoring program, and an operation controlling program are included in an integrated operation program for the electrical storage system, and executing the programs. Meanwhile, the startup self-diagnosis performed by the startup self-diagnostic apparatus 90, the periodic monitoring performed by the periodic monitoring apparatus 110, and the operation control performed by the operation controlling apparatus 120 may be partially implemented by hardware.

Figure 13:
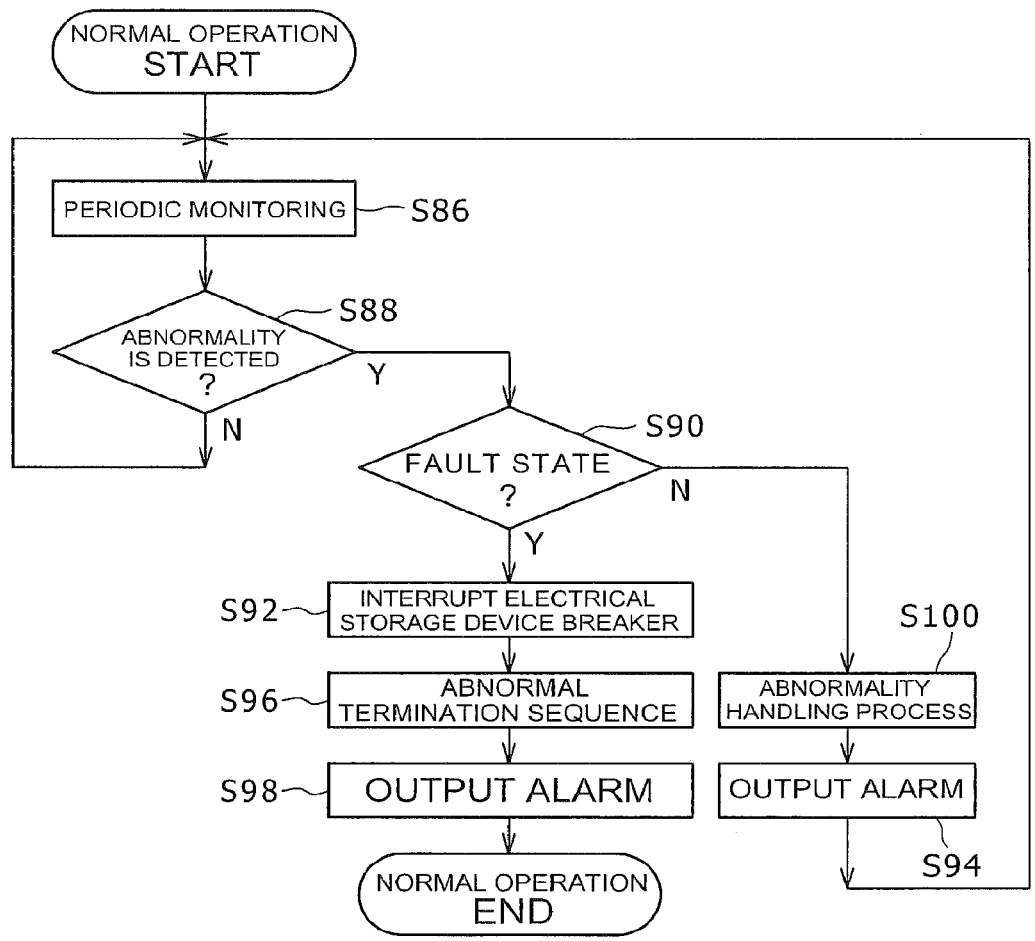
FIG. 13 is a flowchart showing procedural steps for detected abnormality handling in the periodic monitoring according to the embodiment of the present invention.

FIGS. 2 to 12 relate to the startup self-diagnostic apparatus 90, FIGS. 13 and 14 relate to the periodic monitoring apparatus 110, and FIGS. 18 to 22 relate to the operation controlling apparatus 120.

Figure 2:
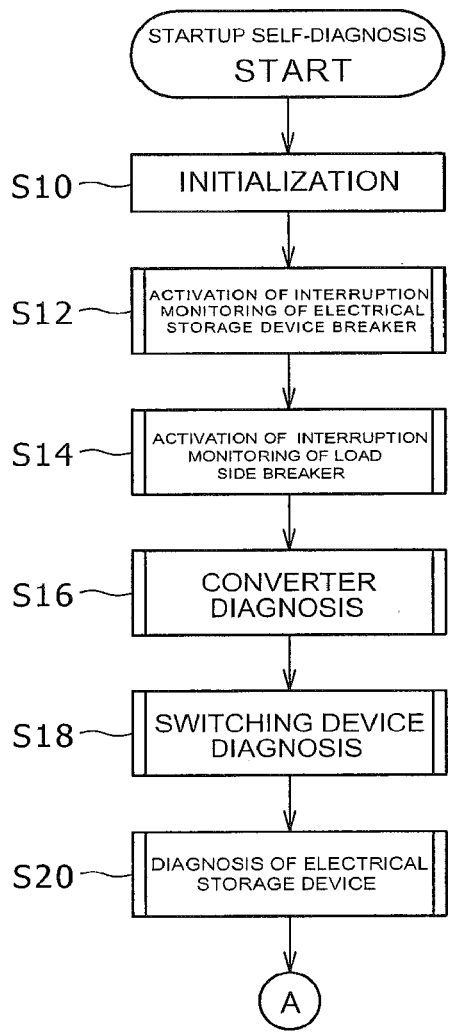
FIG. 2 is a flowchart showing procedural steps of diagnosing peripheral diagnostic items in a self-diagnostic procedure used for an electrical storage system according to the embodiment of the present invention.
Figure 3:
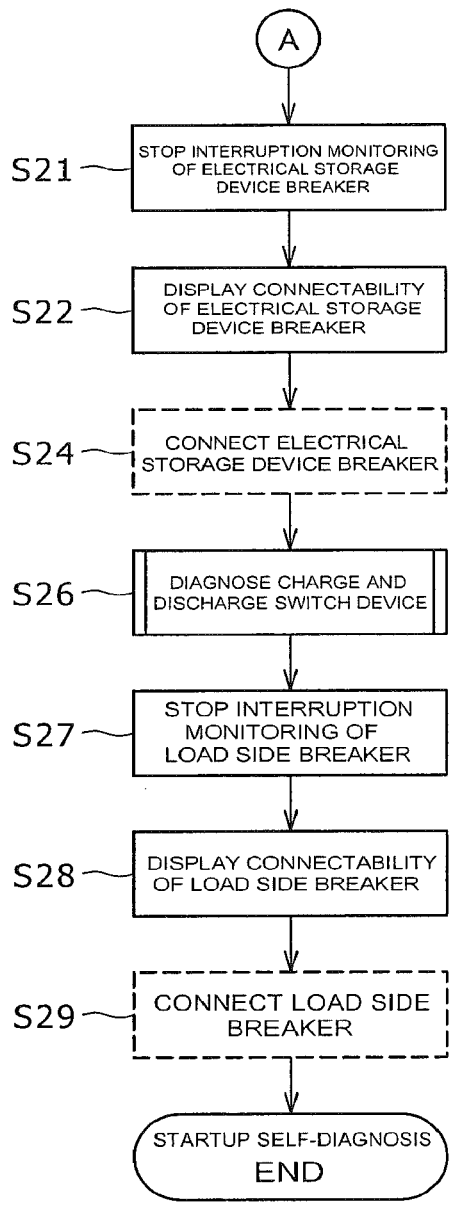
FIG. 3 is a flowchart showing procedural steps subsequent to FIG. 2 in the diagnostic procedure performed using an electrical storage device.

FIGS. 2 and 3 are flowcharts representing procedural steps of the startup self-diagnosis. Here, items that may be diagnosed without using the electrical storage device 30 and items that may be diagnosed while the electrical storage device breaker 50 remains in the interrupted state are referred to as peripheral diagnostic items. The procedural steps of the startup self-diagnosis shown in FIG. 2 represent a procedure to diagnose the peripheral diagnostic items. The procedural steps of the startup self-diagnosis shown in FIG. 3 are used for diagnosing, when a result of diagnosing the peripheral diagnostic items is normal, the charge and discharge switch device 60 with the electrical storage device breaker 50 having been brought into the connected state, and represent a procedure to diagnose the electrical storage device in its usage state. The peripheral diagnostic items are diagnosed prior to diagnosis of other items because, if diagnosis using the electrical storage device 30 is conducted under the presence of an abnormality having been overlooked in any of the components and the electrical storage device breaker that are diagnosable without using the electrical storage device, there is a danger that unexpected overcharge, overdischarge, or overcurrent could occur in the electrical storage device 30, resulting in damage to the electrical storage device 30.

Firstly, explanation is provided with reference to FIG. 2. When the electrical storage system 10 is activated, the integrated operation program for the electrical storage system is launched. The startup self-diagnostic program is one that is initially launched in the integrated operation program for the electrical storage system. First, initialization is performed (S10). Through the initialization, each component of the electrical storage system 10 is set to an initial state. For example, the switching device 20 is established in the series-connected state, while the electrical storage device breaker 50 is established in the interrupted state. Procedural steps of the initialization are carried out by an initialization setting unit 104 in the startup self-diagnostic apparatus 90.

When the initialization is finished, a subroutine for monitoring the electrical storage device breaker 50 being in the interrupted state, which is the initial state, is activated (S12).

Following S12, a subroutine for monitoring, during execution of the procedural steps of the startup self-diagnosis, the load side breaker 26 being in the interrupted state is activated (S14). Subsequent to S14, a converter diagnosis is performed to diagnose whether or not the AC/DC converter 24 is able to normally communicate with the startup self-diagnostic apparatus 90 and operate as commanded (S16). Following S16, a switching device diagnosis is performed to diagnose whether or not the switching device 20 is set to the initial state, and whether or not the switching device 20 is able to normally communicate with the startup self-diagnostic apparatus 90 and operate as commanded (S18). Following S18, an electrical storage device diagnosis is performed to diagnose whether or not the electrical storage device 30 is able to normally communicate with the startup self-diagnostic apparatus 90 and obtain each internal state of the storage battery packs 32, 32-2, 34, 34-2, 36, and 36-2 constituting the electrical storage device 30 (S20).

The above-described steps are the procedural steps for diagnosing the peripheral diagnostic items, and performed by the peripheral item diagnosing 106 unit in the startup self-diagnostic apparatus 90. Here, it should be noted that S12 and S14 may be performed in reverse order, and S16 and S18 may be performed in reverse order. Each of the diagnoses is performed in more particularly subdivided ways by subroutines, details of which will be described further below with reference to FIGS. 4 to 8.

When the result of diagnosing the peripheral diagnostic items is normal, operation moves to steps in FIG. 3. Hereinafter, description is provided with reference to FIG. 3.

Firstly, the subroutine activated in S12 is terminated (S21), and an indication representing that the electrical storage device breaker 50 is in a connectable state is displayed on the display unit 82 (S22). This indication is intended to prompt a user for an action of connecting the electrical storage device breaker 50.

When the user brings the electrical storage device breaker 50 into the connected state (S24), operation moves to a next diagnosis of the charge and discharge switch device 60 upon detection of the connected state. Because S24 is not a step performed by the startup self-diagnostic apparatus 90, a box representing S24 is shown in FIG. 3 with a broken line frame for differentiation from other steps.

In the diagnosis of the charge and discharge switch device (S26), it is diagnosed whether or not both the charge switch 70 and the discharge switch 74 are able to normally communicate with the startup self-diagnostic apparatus 90 and operate as commanded in the connected state of the electrical storage device breaker 50.

When a result of diagnosing the charge and discharge switch device is normal (S26), the subroutine activated in S14 is terminated (S27), and an indication representing that the load side breaker 26 is in a connectable state is displayed on the display unit 82 (S28). This indication is intended to prompt a user for an action of connecting the load side breaker 26.

When the user brings the load side breaker 26 into the connected state (S29), the startup self-diagnosis is finished upon detection of the connected state, and the electrical storage system 10 enters the operating condition. The steps of from S21 to S29 are procedural steps to diagnose the electrical storage device 30 in the usage state, and are carried out by a usage state diagnosing unit 108 in the startup self-diagnostic apparatus 90.

The periodic monitoring in the operating condition is performed by the periodic monitoring apparatus 110, which will be described further below.

The above-described steps are procedural steps of the startup self-diagnosis, specific diagnostic details of which will be more specifically described with reference to FIGS. 4 to 12.

Figure 4:
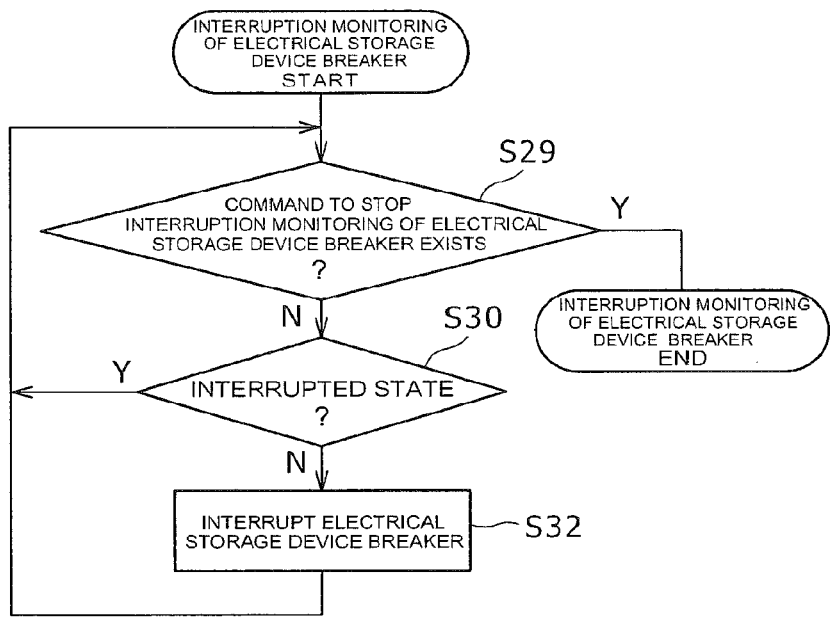
FIG. 4 is a flowchart showing procedural steps for diagnosis of an electrical storage device breaker in FIG. 2.

FIG. 4 is a diagram representing subdivided specific steps in the subroutine activated in S12.

The monitoring, performed by the subroutine activated in S12, as to whether or not the electrical storage device breaker 50 is in the interrupted state is determined based on the presence or absence of a command to stop the monitoring as to whether or not the electrical storage device breaker 50 is in the interrupted state (S29) while the procedural steps of diagnosing the peripheral diagnostic items are being performed. In other words, interruption of the electrical storage device breaker 50 is continuously monitored while the peripheral diagnostic items are being diagnosed. Whether or not the electrical storage device breaker 50 is in the interrupted state is monitored by monitoring each interrupted state of the breakers 52, 54, and 56 constituting the electrical storage device breaker 50 (S30). The monitoring in S30 is carried out by checking whether or not the status signal transmitted from each breaker 52, 54, 56 via the signal line to the startup self-diagnostic apparatus 90 indicates the interrupted state.

The initial state of the electrical storage device breaker 50 is the interrupted state as described above. Therefore, when a connected state is detected, an interruption command is transmitted to the corresponding breaker from the startup self-diagnostic apparatus 90 (S32). This causes the electrical storage device breaker 50 to be brought into the interrupted state. Upon detection of the interrupted state, the monitoring is continued. An immediate trip of the connected electrical storage device breaker into the interrupted state can prevent the electrical storage device 30 from being damaged due to occurrence of unexpected overcharge, overdischarge, or overcurrent, and allows the procedural steps of diagnosing the peripheral diagnostic items to be continuously performed.

Procedural steps in the subroutine activated in S12 are carried out by the state monitoring unit 92 for the electrical storage device breaker in the startup self-diagnostic apparatus 90.

Figure 5:
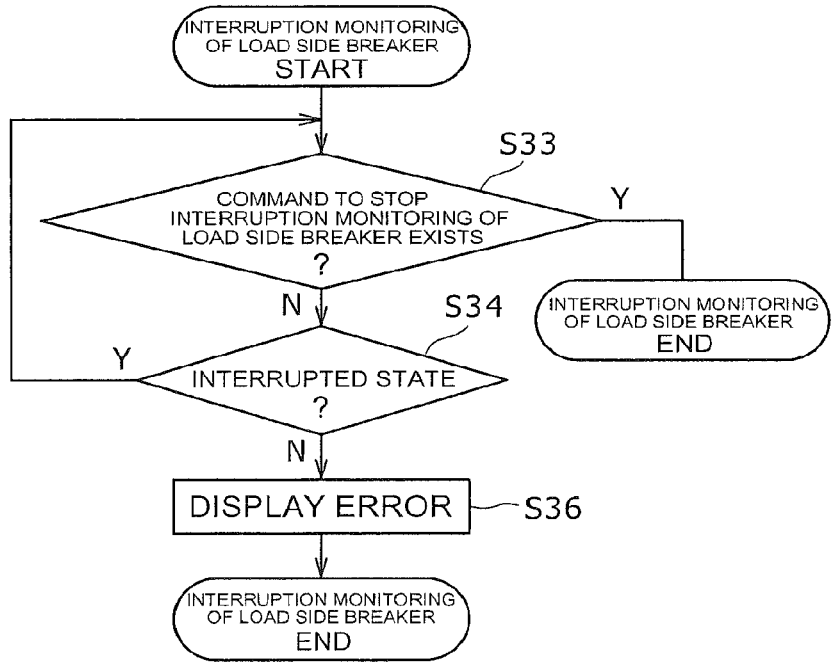
FIG. 5 is a flowchart showing procedural steps of a load side breaker diagnosis in FIG. 2.

FIG. 5 is a diagram showing subdivided specific steps in the subroutine activated in S14.

The subroutine activated in S14 includes steps substantially identical to those of the subroutine in S12, but differs from the subroutine in S12 in that the load side breaker 26 is composed of only one breaker, and that a state of the load side breaker 26 can not be changed from a startup self-diagnostic apparatus 90 side because the load side breaker 26 is of the manually-operated type.

The monitoring of whether or not the load side breaker 26 is in the interrupted state is determined based on the presence or absence of a command to stop the monitoring as to whether or not the load side breaker 26 is in the interrupted state while the procedural steps of diagnosing the peripheral diagnostic items are being performed (S33). In other words, interruption of the load side breaker 26 is continuously monitored while the peripheral diagnostic items are being diagnosed. The monitoring as to whether or not the load side breaker 26 is in the interrupted state (S34) is carried out by checking whether or not the status signal transmitted from the load side breaker 26 via the signal line to the startup self-diagnostic apparatus 90 indicates the interrupted state.

The load side breaker 26, which is of the manually-operated type, has no function of receiving any command from the startup self-diagnostic apparatus 90. Therefore, when manual switching operation is performed by the user and the connected state is detected, the load side breaker diagnosis is terminated after lighting the error lamp 86 and displaying an error on the display unit 82.

The procedural steps in the subroutine activated in S14 are carried out by the state monitoring unit 94 for the load side breaker in the startup self-diagnostic apparatus 90.

Figure 6:
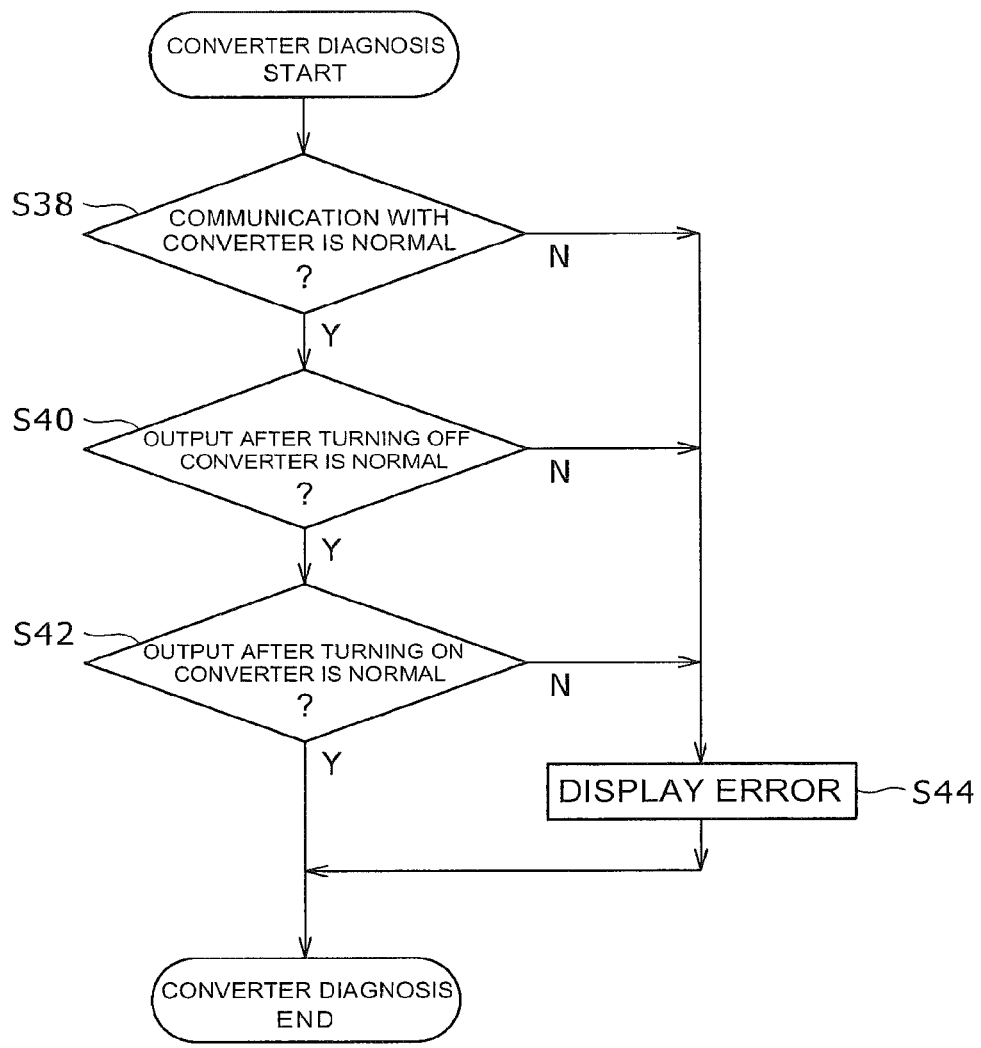
FIG. 6 is a flowchart showing procedural steps for a converter diagnosis in FIG. 2.

FIG. 6 is a diagram showing subdivided specific steps of the converter diagnosis in S16.

In S16, whether or not communication between the AC/DC converter 24 and the startup self-diagnostic apparatus 90 is normally performed is diagnosed first (S38). Specifically, the diagnosis is performed by checking whether or not a response is made to a command having been transmitted from the startup self-diagnostic apparatus 90 to the AC/DC converter 24. When the communication is normal, it is secondly diagnosed whether or not the AC/DC converter 24 operates as commanded.

After operation commands of an off command and an on command are issued, it is diagnosed whether or not an output of the AC/DC converter 24 corresponding to each of the commands is normal. Specifically, when a command for turning off the AC/DC converter is provided, the discharge-side current/voltage detecting unit 76 is used to find that no output voltage is provided from the AC/DC converter 24 (S40). In addition, when a command for turning off the AC/DC converter is provide, the discharge-side current/voltage detecting unit 76 is used to find that an output voltage is provided from the AC/DC converter 24 (S42).

When results in S40 and S42 are normal continuously following S38, the AC/DC converter 24 is determined to be in a normal state. Then, the converter diagnosis is finished, and operation moves to the next step. When any one of the processed results is abnormal, the converter diagnosis is terminated after lighting the error lamp 86 and displaying an error on the display 82 (S44). The procedural steps of the converter diagnosis in S16 are carried out by the converter diagnosing unit 96 in the startup self-diagnostic apparatus 90.

Figure 7:
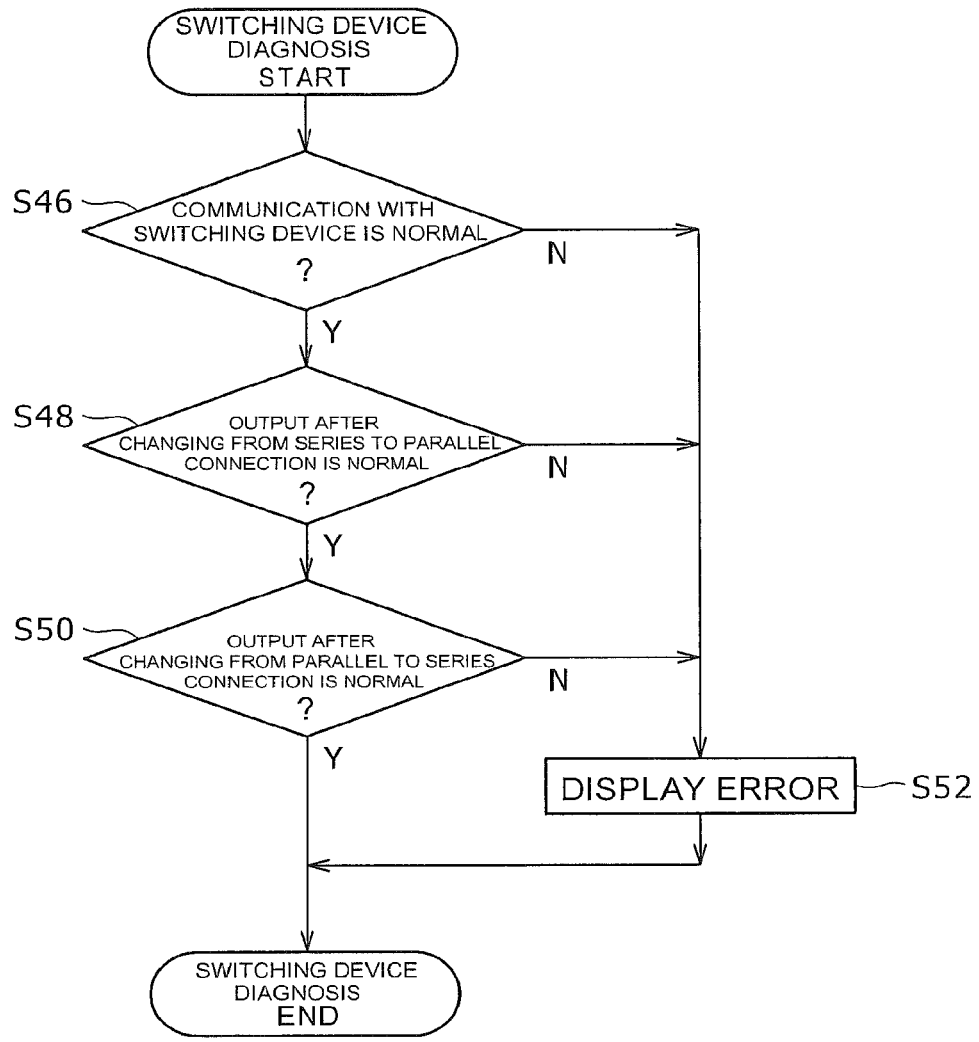
FIG. 7 is a flowchart showing procedural steps for a switching device diagnosis in FIG. 2.

FIG. 7 is a diagram showing subdivided specific steps of the switching device diagnosis in S18 to be performed when the result of the converter diagnosis in S16 is normal.

In S18, it is first diagnosed whether or not communication between the switching device 20 and the startup self-diagnostic apparatus 90 is normally performed (S46). Specifically, the diagnosis is conducted by checking whether or not a response is made to a command to inquire about the connection state that has been sent from the startup self-diagnostic apparatus 90 to the switching device 20. When the communication is normal, it is secondly diagnosed whether or not the switching device 20 operates as commanded.

After operation commands of a series connection command and a parallel connection command are issued, it is diagnosed whether or not an output of the switching device 20 corresponding to each of the commands is normal. Because the initial state of the switching device 20 is the series-connected state, the parallel connection command is provided to the switching device 20, to diagnose whether or not the series-connected state is changed to the parallel-connected state. Specifically, a voltage value in the charge-side current/voltage detecting unit 72 is used to find whether or not the output is normal (S48). For example, as long as it is a sunny day, because a change from the series-connected state to the parallel-connected state causes the photoelectric conversion module 14 and the charge and discharge switch device 60 to be brought into the electrically connected states, an output voltage from the photoelectric conversion module 14 is detected by the charge-side current/voltage detecting unit 72. In other words, the voltage changes from 0 V to the output voltage of the photoelectric conversion module 14 of, for example, approximately 120 V. As such, it is diagnosed by detecting the voltage value in the charge-side current/voltage detecting unit 72 as to whether or not the operation responding to the parallel connection command is normal.

Then, after the series connection command is provided to the switching device 20, whether or not the parallel-connected state is changed to the series-connected state is found by checking, based on the voltage value in the charge-side current/voltage detecting unit 72, whether or not the output is normal (S50). In this case, the change from the parallel-connected state to the series-connected state causes the photoelectric conversion module 14 and the charge and discharge switch device 60 to be electrically disconnected, which changes the voltage value in the charge-side current/voltage detecting unit 72 to 0 V. Thus, the change to 0 V of the voltage value in the charge-side current/voltage detecting unit 72 is identified, to thereby diagnose whether or not operation performed in response to the series connection command is normal. It should be noted that although, during a sunny day, the normal operation can be identified based on the change in the voltage value as described above, it is difficult to diagnose the switching device during night hours. Because of this, an illuminance meter, for example, may be provided to find, from a measured illuminance, whether or not it is nighttime (whether or not power producible light irradiation is obtained). Then, the diagnosis may be skipped when it is not possible to generate electric power by the photoelectric conversion module 14.

When results in S48 and S50 are normal continuously following S46, the switching device 20 is determined to be in the normal state. Then, the switching device diagnosis is finished, and operation moves to a next step. If any one of the processed results shows that the switching device 20 is not normal, the switching device diagnosis is terminated after lighting the error lamp 86 and displaying the error on the display unit 82 (S52). The above procedural steps are carried out by the switching device diagnosing unit 98 in the startup self-diagnostic apparatus 90.

Figure 8:
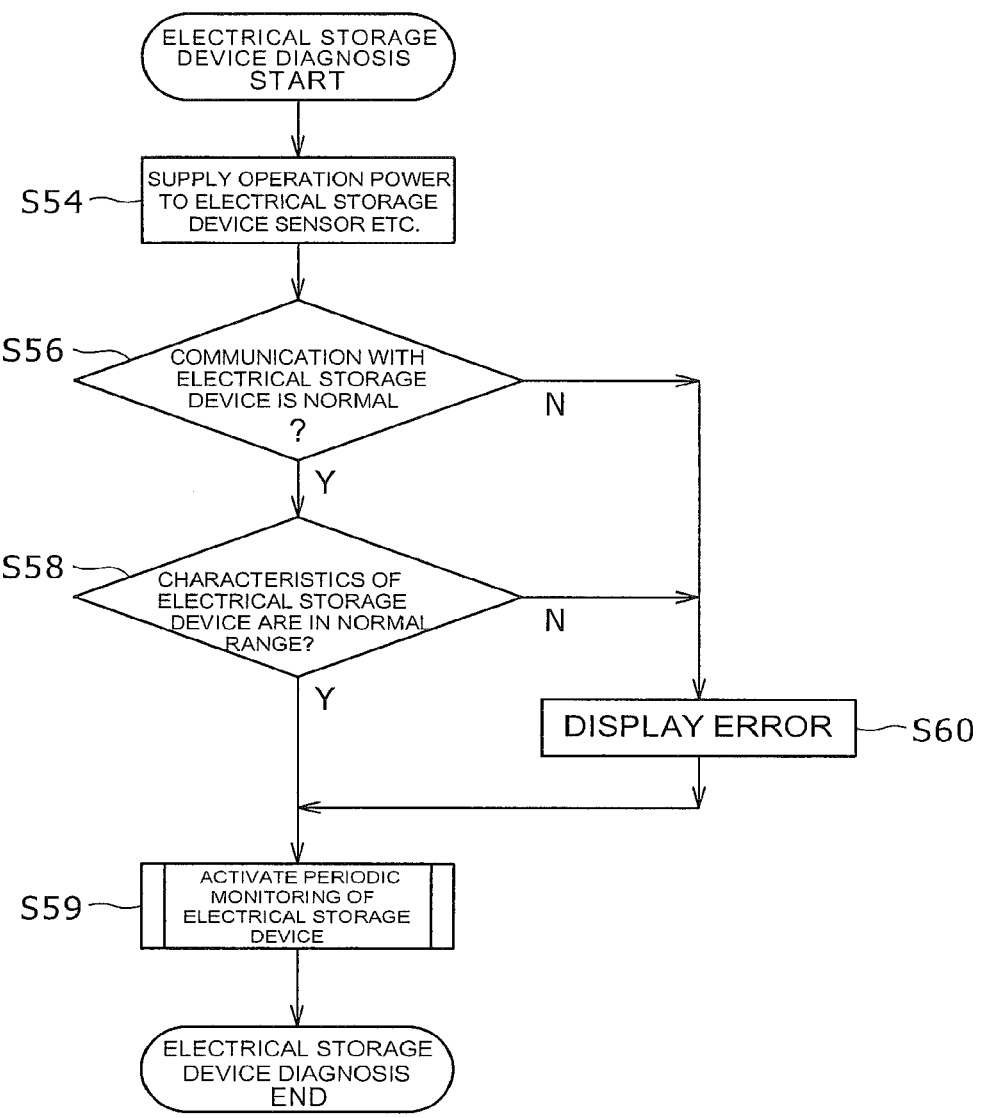
FIG. 8 is a flowchart showing procedural steps for the electrical storage device diagnosis in FIG. 3.

FIG. 8 is a diagram showing subdivided specific steps of the electrical storage device diagnosis in S20 to be performed when the result of diagnosing the switching device is normal.

Firstly, an operating power source is supplied to the sensors and other components in the electrical storage device 30 (S54). In other words, electric power such as, for example, power of 12 V is supplied from the startup self-diagnostic apparatus 90 to an electrical storage device 30 side. The operation power is respectively supplied to the storage battery state detecting units 38, 38-2, 40, 40-2, 42, 42-2 in each storage battery pack.

Then, it is diagnosed whether or not communication between the electrical storage device 30 and the startup self-diagnostic apparatus 90 is normally performed (S56). Specifically, in the diagnosis, a response to a command transmitted from the startup self-diagnostic apparatus 90 to each of the storage battery state detecting units 38, 38-2, 40, 40-2, 42, 42-2 in the storage battery packs is determined to be present or absent. Further, when communication lines of the storage battery packs, which are series-connected to each other, are connected in series, and a communication line with the startup self-diagnostic apparatus 90 is provided for each parallel connection as shown in FIG. 1, the startup self-diagnostic apparatus 90 can know, in addition to the number of the storage battery packs constituting the electrical storage device 30, the number of parallel connections, and the number of series connections in each parallel connection, through communication. In this way, the configuration of the electrical storage device 30 can be known through communication, which can contribute to reduction in the possibility of occurrence of overcurrent.

When communication is normal, a diagnosis is conducted to find whether or not a characteristic of each of the storage battery packs 32, 32-2, 34, 34-2, 36, 36-2 constituting the electrical storage device 30 lies within a normal range, and whether or not any abnormal state, such as a sensor abnormality, overcurrent, overdischarge, or overcharge, is detected as the internal state of the storage battery pack (S58). The diagnosis is performed based on data detected by the storage battery state detecting units 38, 38-2, 40, 40-2, 42, 42-2 respectively corresponding to the storage battery packs 32, 32-2, 34, 34-2, 36, 36-2 and internal state data. In other words, the electrical storage device 30 is diagnosed as being normal when an output voltage, an internal temperature, and other characteristics of each storage battery pack lie within a predetermined normal range, and diagnosed as being abnormal when the output voltage and other characteristics exceed the normal range. Further, the diagnosis as being normal is made when none of the abnormal states, such as the sensor abnormality, overcurrent, overdischarge, and overcharge, is detected as the internal state of the storage battery pack, while the diagnosis as being abnormal is made when any one of the abnormal states is detected.

Figure 8A:
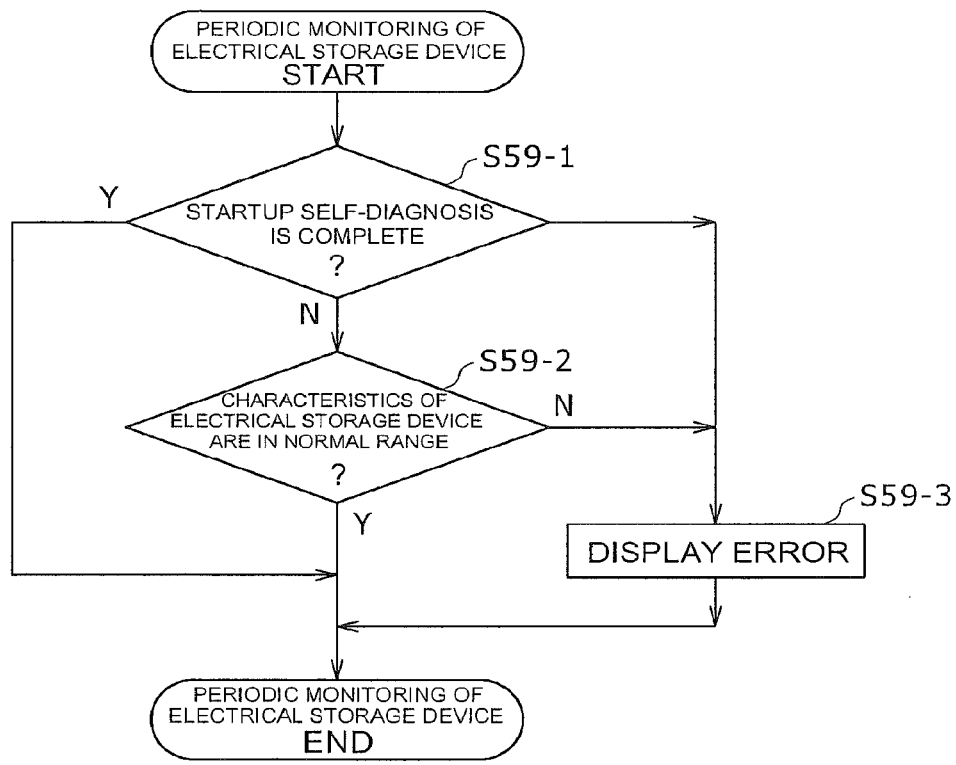
FIG. 8A is a flowchart showing procedural steps for periodically monitoring the electrical storage device in FIG. 3.

When the result in S58 is normal continuously following S56, the electrical storage device 30 is determined to be in the normal state as a whole, and the diagnosis of the electrical storage device is finished after activating the periodic monitoring of the electrical storage device is activated (S59). Then, operation moves to subsequent steps. If any one of the processed results is abnormal, the diagnosis of the electrical storage device is terminated after lighting the error lamp 86 and displaying an error on the display unit 82 (S60). The periodic monitoring of the electrical storage device is periodically performed, for example, at intervals of one second until the diagnosis in S58 is completed in the startup self-diagnosis. More specifically, referring to FIG. 8A, whether or not the startup self-diagnosis is completed is determined (S59-1), and when the startup self-diagnosis is not completed, it is diagnosed whether or not the characteristic of each of the storage battery packs 32, 32-2, 34, 34-2, 36, 36-2 constituting the electrical storage device 30 lie in the normal range, and whether or not any abnormal state, such as the sensor abnormality, overcurrent, overdischarge, or overcharge, is detected as the internal state of the storage battery pack (S59-2). The diagnosis as being normal is made when none of the abnormal states, such as the sensor abnormality, overcurrent, overdischarge, and overcharge, is detected as the internal state of the storage battery pack. On the other hand, when any one of the abnormal states is detected, the diagnosis as being abnormal is made, to thereby terminate the periodic monitoring of the electrical storage device after lighting the error lamp 86 and displaying an error on the display unit 82 (S59-3). The above procedural steps are carried out by the electrical storage device diagnosing unit 100 in the startup self-diagnostic apparatus 90.

Because the electrical storage device is periodically monitored, it is possible to prevent the electrical storage device 30 from being damaged even when the electrical storage device 30 might undergo unexpected overcharge, overdischarge, or overcurrent during the below-described diagnosis to be performed using the electrical storage device 30.

Figure 9:
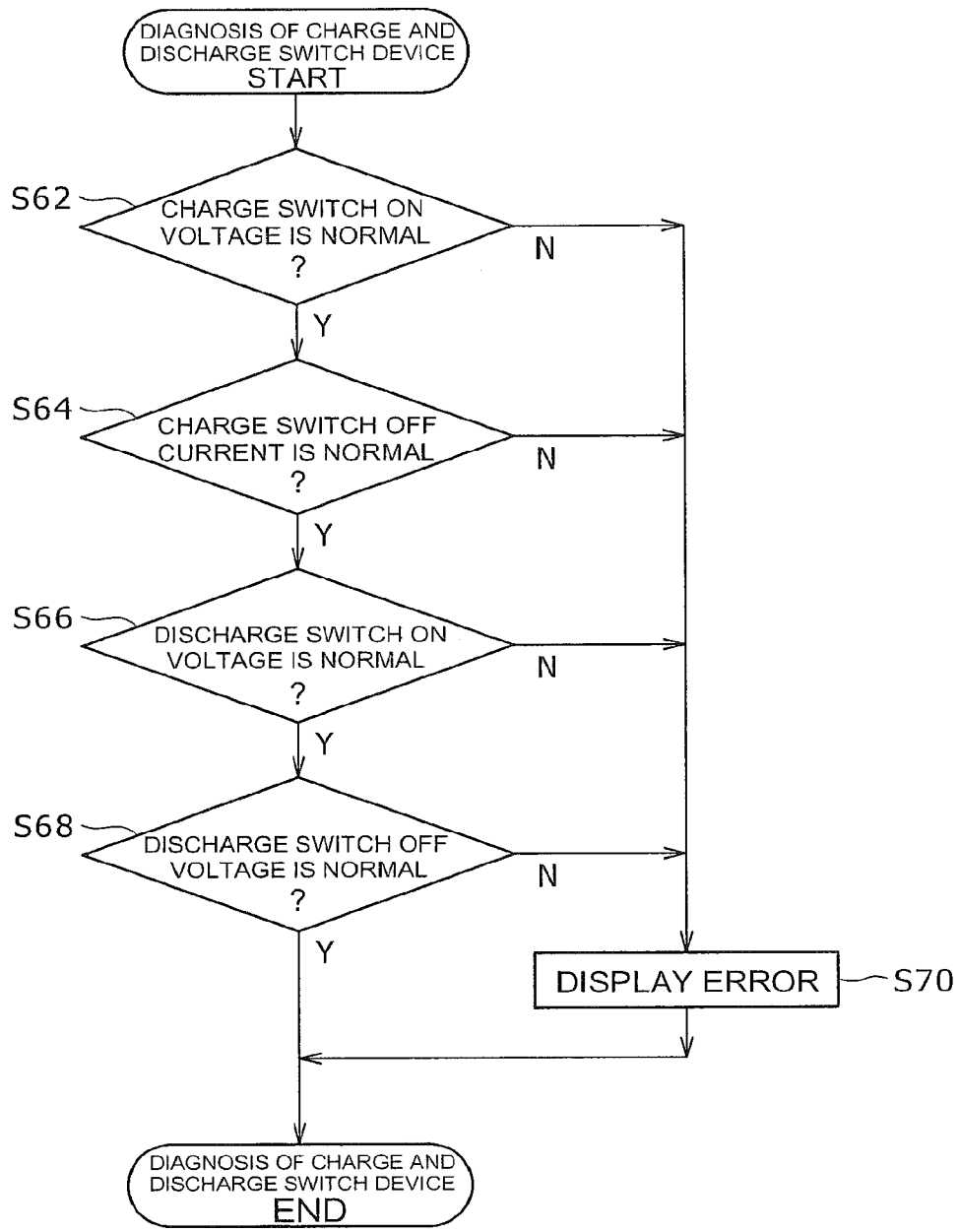
FIG. 9 is a flowchart showing procedural steps for diagnosis of a charge and discharge switch device in FIG. 3.

FIG. 9 is a diagram representing subdivided specific steps of the diagnosis of the charge and discharge switch device (S26) to be performed when the electrical storage device breaker 50 is brought into the connected state by the user (S24). Here, whether or not on/off actions of the charge switch 70 and the discharge switch 74 are normal is diagnosed.

It is first diagnosed whether or not the on action of the charge switch 70 is normal (S62). In this step, an on command is given to the charge switch 70 to thereby put the charge switch 70 in an on state. Then, a voltage value of the charge-side current/voltage detecting unit 72 is compared with voltage values of the current/voltage detecting units 62, 64, 66 on the electrical storage device side. When a voltage difference between the voltage values lies within a predetermined range, the on action is determined to be normal. The presence of a voltage difference exceeding the predetermined range regardless of the on command indicates an abnormality (an open state).

Secondly, it is diagnosed whether or not the off action of the charge switch 70 is normal (S64). Here, an off command is given to the charge switch 70 to thereby put the charge switch 70 in an off state. Then, when a current value of the charge-side current/voltage detecting unit 72 or current values of the current/voltage detecting units 62, 64, 66 lie within a predetermined measurement error range including 0 A, the off action is determined to be normal. Detection of any current passing through the photoelectric conversion module 14 regardless of the off command indicates an abnormality (shorting).

As in the case of S62, a diagnosis as to whether or not the on action of the discharge switch 74 is normal is conducted (S66). Here, the on command is issued to the discharge switch 74, to thereby put the discharge switch 74 in the on state. Then, a voltage value of the discharge-side current/voltage detecting unit 76 is compared with those of the current/voltage detecting units 62, 64, 66 on the electrical storage device side. When a voltage difference between the voltage values is in the predetermined range, the on action is determined to be normal. The presence of a voltage value exceeding the predetermined range regardless of the on command indicates an abnormality (open state).

As in the case of S64, a diagnosis as to whether or not the off action of the discharge switch 74 is normal is conducted (S68). Here, the off command is given to the discharge switch 74, thereby bringing the discharge switch 74 into the off state. Then, when the voltage value of the discharge-side current/voltage detecting unit 76 lies within a measurement error range including 0 V, the off action is determined to be normal. Detection of any voltage of the electrical storage device 30 regardless of the off command indicates abnormality (shorting). It should be noted that the determination is based on the voltage value rather than the current value because no current is passed due to interruption of a load side breaker 26 side.

Further, the steps of S62, S64 and the steps of S66, S68 may be performed in reverse order.

When results of the above steps are normal, the charge and discharge switch device 60 is determined to be normal, and the diagnosis of the charge and discharge switch device is finished. Operation moves to the next step. When any one of the processed results is not normal, the diagnosis of the charge and discharge switch device is terminated after lighting up the error lamp 86 and displaying an error on the display unit 82 (S70). The above procedural steps are carried out by the switch diagnosing unit 102 in the startup self-diagnostic apparatus 90.

When the result of diagnosing the charge and discharge switch device 60 is normal, the interruption monitoring of the load side breaker 26 is stopped (S27), and permission to connect the load side breaker is displayed (S28). Then, when the user brings the load side breaker 26 into the connected state (S29), the startup self-diagnosis is completed upon detection of the connected state.

In the startup self-diagnosis, when any abnormality is detected, an indication of error is displayed by the state monitoring unit for the load side breaker and each diagnosing unit. Then, the electrical storage device breaker 50 is turned off, for example, and an abnormal termination sequence for restoring each component in the electrical storage system 10 to the initial state is performed while the startup self-diagnosis is finished.

FIG. 10 is a diagram showing a display screen of the display unit 82 in S22 of FIG. 3. As illustrated, a text message to inform the user that the electrical storage device breaker 50 may be brought into the connected state is displayed, thereby prompting the user to bring the electrical storage device breaker 50 into the connected state.

FIG. 11 is a diagram showing a display screen of the display unit 82 in S28 of FIG. 3. As illustrated, a text message to inform the user that the load side breaker 26 may be brought into the connected state is displayed, thereby prompting the user to bring the load side breaker 26 into the connected state.

FIG. 12 is a diagram showing a display screen of the display unit 82 used for displaying an error indication. Here, because an abnormality has been detected in the startup self-diagnosis, text representing a request to turn off the power source is displayed in an alerting way. Two lines below the text are columns for the error indication. Because the display unit 82 is a compact type display, a plurality of error indications may be successively displayed on the display screen by means of not-illustrated right and left keys in such a manner that a subsequent error indication appears on the display screen when the left key is pressed once, while a previous error indication appears when the right key is pressed once.

In the error indication, a combination of alphanumeric characters can be used to describe a plurality of items of the contents. In FIG. 12, letters A and B are used for distinguishing a sequential stage in which the abnormality is found. In this example, A represents a factor that has caused abnormal termination in the procedural steps of the startup self-diagnosis, while B represents a factor that has further caused an abnormality when the abnormal termination sequence is performed. Examples of B include abnormalities, such as a failure in confirmation of the on/off action of the charge switch 70 or the discharge switch 74, that occur when it is impossible to restore the system to the initial state. Selection of A or B can be performed using a cursor displayed on a left side of the screen. For the selected sequential stage, a plurality of error indications may be successively displayed using the above-described right and left keys. Indications other than A, B, and so on may be, of course, used for further distinguishing other sequential stages.

A two-digit number following A or B is an error serial number. A subsequent two-digit number after a character "/" is the total number of errors, showing how many errors exist in total. Therefore, "A01/03" means that three errors are detected during the startup self-diagnosis, and a content of a first error in the three errors is displayed therein.

Next, a 7-digit combination of numerals composed of two digits, two digits, and three digits represents the contents of the errors. The first two digits indicate a type of the device which is an object to be diagnosed, the next two digits indicate a discrimination number used, when the device to be diagnosed contains a plurality of objects to be diagnosed, for distinguishing the plurality of objects to be diagnosed, and the final three digits represent an error code. For example, the first two digits may be composed of "01" associated with the converter, "02" associated with the switching device, "03" associated with the electrical storage device, and so on. When the contents of an error are indicated as described above, "03-11-003" in FIG. 12 can be read as the first "03" denoting the electrical storage device, the next "11" denoting the [1 (parallel connection number)–1 (series connection number)] th storage battery pack, and the final "003" denoting a communication abnormality, for example, indicated by the error code "003".

It is to be understood that the above description is provided by way of example to explain the error indication, and other methods for indicating errors may be used. Further, the text described in FIGS. 10, 11, and 12 are provided as an example, and other text may be used. In addition, text in a language other than Japanese, such as alphabet letters, may be used for the indications depending on specifications of the display.

Up to this point, the startup self-diagnostic apparatus 90 have been described, and the periodic monitoring apparatus 110 will be explained with reference to FIGS. 13 and 14 below. The periodic monitoring apparatus 110 functions, after entering into its operating condition when the electrical storage system 10 is determined to be normal in the startup self diagnosis, to periodically monitor whether or not each component of the electrical storage system 10 is in the normal state under the operation condition. The time at which to perform the periodic monitoring can be predefined. For example, the time may be specified based on, for example, intervals of one second, or may be specified in other ways, such as every time the electrical storage device 30 reaches a predefined charged state.

FIG. 13 is a flowchart for explaining procedural steps to be performed during normal operation continuously following the procedural steps of the startup self-diagnosis.

When the operating condition is initiated, whether or not each component in the electrical storage system 10 is normal is periodically monitored (S86). More specifically, the periodic monitoring in this case is performed, as contrasted with the periodic monitoring in S59, under a condition that the electrical storage device breaker 50 and the load side breaker 26 are both in the connected state. In this periodic monitoring, the characteristics and the internal state of the electrical storage device 30 are also periodically monitored, as in the case of S59 in which the electrical storage device is periodically monitored during the startup self diagnosis.

Here, when any abnormality is detected as a result of the periodical monitoring (S88), a detected abnormal state is classified based on predetermined classification criteria as the early recovery unforeseeable fault state or as the restorable abnormal state. This process step is performed by the detected abnormality classifying unit 112 in the periodic monitoring apparatus 110.

According to the classification, it is determined whether or not the detected abnormal state is the early recovery unforeseeable fault state (S90). When the detected abnormal state is classified as the early recovery unforeseeable fault state, the electrical storage device breaker 50 is tripped (S92), and an abnormal termination sequence for restoring the system to the initial state is carried out in addition to outputting an alarm (S98). Then, the normal operation is terminated. This process step is performed by the fault state handling unit 114 in the periodic monitoring apparatus 110. When the detected abnormal state is classified as the restorable fault state, appropriate processing to address abnormalities, such as a temporary halt of charge and/or discharge, is performed depending on the detected abnormal state (S100) in addition to outputting an alarm (S94). The output of the alarm includes lighting up the error lamp 86 and displaying an error message on the display unit 82. This process step is performed by the abnormal state handling unit 116 in the periodic monitoring apparatus 110.

Thus, when an abnormality is detected during the periodic monitoring, rather than uniformly assuming the abnormality as a fault and accordingly halting operation of the electrical storage system 10, classification into categories of the restorable abnormal state and the early recovery unforeseeable fault state is performed. This is intended to improve an availability factor of the electrical storage system 10 by means of appropriate abnormality handling. The restorable abnormal state may be subdivided into a plurality of levels, such as an abnormal state 1, an abnormal state 2, and an abnormal state 3, or may include subdivisions corresponding to abnormal handling process steps.

FIG. 14 is a diagram showing an example of the classification criteria for the detected abnormality. Here, requirements for determining abnormality are defined with respect to each object to be monitored, and classification between the early recovery unforeseeable fault state and the restorable abnormal state is also defined for a detected abnormality corresponding to each of the requirements. The classification criteria for the detected abnormality are previously stored in a memory unit of the periodic monitoring apparatus 110. The classification criteria for the detected abnormality may be stored in the form of a hierarchical structural look-up table as shown in FIG. 14, or may be stored in a form suitable for outputting the classification between the early recovery unforeseeable fault state and the restorable abnormal state in response to a retrieval key being input using a hierarchical structure, a simplified map format, or other forms.

Viewing, in FIG. 14, items to be periodically monitored in the electrical storage device 30, it is indicated that the battery state being overdischarged and being overcharged, and the battery temperature being abnormal, are classified as the early recovery unforeseeable fault state. On the other hand, the battery state being fully charged is classified as the restorable abnormal state. A full charge is not an abnormality for the electrical storage device 30, but is an abnormal state for the system because the system performs charge and discharge control in accordance with the charged state of the electrical storage device 30 in a range where the electrical storage device 30 is not fully charged. A full charge that incurs no risk of damaging the electrical storage device 30 is classified as the restorable abnormal state. The overcharge and overdischarge, which are abnormal states in the electrical storage device 30, and also highly likely to damage the electrical storage device 30, need to be immediately addressed in terms of safety for the system. Thus, they are classified as the early recovery unforeseeable fault state, whereby the electrical storage device breaker 50 is tripped to disconnect the electrical storage device 30 from the system.

Referring to items to be periodically monitored in the charge and discharge switch device 60, an abnormal charging current value and an abnormal discharging current value are indicated as restorable abnormal states, while continuation of the abnormal states for a predetermined time period or longer is indicated as the early recovery unforeseeable fault state. The reason for this is that as a charging current value or a discharging current value may momentarily become greater in some cases, the abnormal charging and discharging current values themselves can be regarded as being restorable, yet a long-continued state of the current values could damage the electrical storage device 30.

Meanwhile, a state where the charge switch 70 or the discharge switch 74 partially constituting the charge and discharge switch device 60 does not normally operate in response to a predetermined action directive is classified as the early recovery unforeseeable fault state. The reason for this is that because, in the above-described state, control for charging or discharging the electrical storage device 30 cannot be performed, the state is highly likely to cause damage to the electrical storage device 30 unless the state is improved.

As described above, rather than uniformly defining the detected abnormalities as fault states, the detected abnormal states are particularly classified depending on details of the abnormality, to thereby prevent restorable abnormalities from being classified as the fault state, which can contribute to improvement in the availability factor of the electrical storage system 10. On the other hand, dangerous states that might cause damage to the electrical storage device 30 are classified as the early recovery unforeseeable state, and the electrical storage device breaker 50 is accordingly tripped, which can provide protection to the electrical storage device 30.

In the above description, the diagnosis of the charge and discharge switch device in S26 is carried out with the electrical storage device breaker 50 having been put into the connected state and the load side breaker 26 having been put into the interrupted state in the startup self-diagnosis. Although a great number of electrical storage systems are equipped with the load side breaker 26 between the discharge switch 74 and the load, the discharge switch 74 may be, depending on circumstances, directly connected to an inverter or a DC/DC converter in some electrical storage systems. In this case, even through the discharge switch 74 is turned off, a voltage still remains applied to a load side of the discharge switch 74 in a condition where a primary-side capacitor, which is an input-side capacitance of the DC/DC converter, is in a charged state. As a result, the discharge switch 74 apparently seems to be turned on. Hereinafter, a discharge switch diagnosis will be described in which erroneous determination can be avoided even in the absence of the load side breaker 26.

Figure 15:
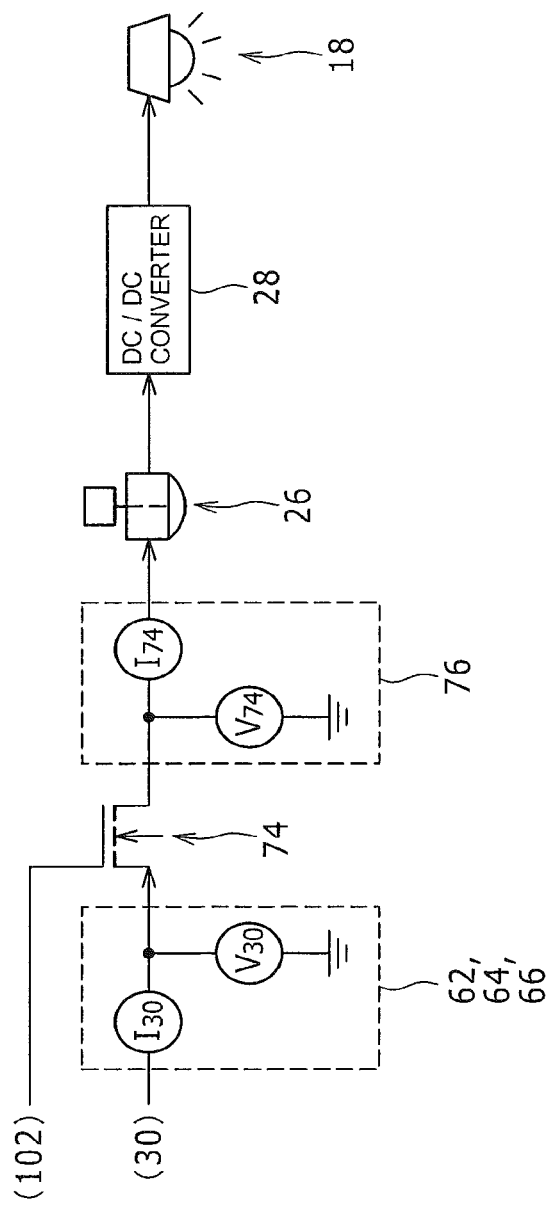
FIG. 15 is a diagram showing a part related to the diagnosis of the charge and discharge switch device in the embodiment of the present invention.

FIG. 15 is a diagram in which a part around the discharge switch 74 is shown separately from the general configuration diagram of FIG. 1. Here, the discharge-side current/voltage detecting unit 76 is composed of a current detector for detecting a current $I_{74}$ passing through the discharge switch 74 and a voltage detector for detecting a voltage $V_{74}$ at a load-side terminal of the discharge switch 74. Similarly, the current/voltage detecting units 62, 64, 66 on the electrical storage device side are respectively composed of the current detectors and the voltage detectors, which are collectively illustrated as a current detector for detecting a current $I_{30}$ passed from the electrical storage device 30 to the discharge switch 74 and as a voltage detector for detecting a voltage $V_{30}$ at a terminal on the electrical storage device side of the discharge switch 74. Meanwhile, the on command and the off command issued to the discharge switch 74 are transmitted from the charge switch diagnosing unit 102.

FIG. 16 is a diagram in which an example of determining whether operation of the discharge switch 74 is normal or abnormal is divided and shown in three categories. Here, the example is first divided into two categories of the startup self-diagnosis in the electrical storage system and the periodic monitoring during operation of the electrical storage device, and the former is then divided between a case where the load side breaker is installed but put into the interrupted state and a case where the load side breaker is not installed and the DC/DC converter is always connected to the discharge switch 74. Using the schematic diagram around the discharge switch 74 for each of the cases which is shown in FIG. 15, a manner of utilizing results of detecting $I_{74}$ in the current detector and detecting $V_{74}$ in the voltage detector for determining actions performed when the on command is provided to the discharge switch 74 and performed when the off command is provided to the discharge switch 74 is summarized for each of the cases.

The startup self-diagnosis performed when the load side breaker 26 is installed and put into the interrupted state has already been described with reference to FIG. 9. Namely, in the diagnosis as to whether or not the on action of the discharge switch 74 is normal, the on command is provided to the discharge switch 74 to thereby turn on the discharge switch 74. Then, the voltage value from the discharge-side current/voltage detecting unit 76 is compared with those from the current/voltage detecting units 62, 64, 66 on the electrical storage device side, and the on action is determined to be normal as long as the voltage difference between the voltage values lies within the predetermined range. Any voltage difference exceeding the predetermined range regardless of the on command means abnormality (open state).

On the other hand, in the diagnosis as to whether or not the off action of the discharge switch 74 is normal, the off command is given to the discharge switch 74, to thereby turn off the discharge switch 74. When the voltage value of the discharge-side current/voltage detecting unit 76 lies in the predetermined measurement error range including 0V, the off action is determined to be normal. Any voltage at the electrical storage device 30 detected regardless of the off command means abnormality (shorting). Here, the reason for performing the determination based on the voltage value rather than the current value is that no current is passed due to interruption on the load side breaker 26 side.

In the startup self-diagnosis of FIG. 16, determination regarding the on action of the discharge switch 74 performed when the load side breaker 26 is not installed is identical to that performed when the load side breaker 26 is installed. Determination as to whether or not the off action of the discharge switch 74 is normal, however, differs from that performed when the load side breaker 26 is installed. This is because, in a case where the load side breaker 26 is not installed, the discharge switch 74 is directly connected to the DC/DC converter 28, with a result that a voltage state of the input-side capacitance of the DC/DC converter 28 is detected as $V_{74}$ by the voltage detector. In other words, when the on command is given to the discharge switch 74, a current is supplied via the DC/DC converter 28 to the DC load 18. Thus, the input-side capacitance of the DC/DC converter 28 is charged with the current, thereby having a voltage of $V_{30}$.

Here, when the off command is given to the discharge switch 74, although supply of the current to the DC/DC converter 28 is stopped, the input-side capacitance continuously maintains the voltage of $V_{30}$ unless it is discharged. When the load side breaker 26 exists, the off action of the discharge switch 74 can be determined to be abnormal as long as $V_{74}=V_{30}$. When the load side breaker 26 does not exist, however, the off action of the discharge switch 74 may not necessarily be abnormal even though $V_{74}=V_{30}$. Instead, focusing attention on $I_{74}$, the off action of the discharge switch 74 can be determined to be abnormal when $I_{74}$ is passed.

Figure 17:
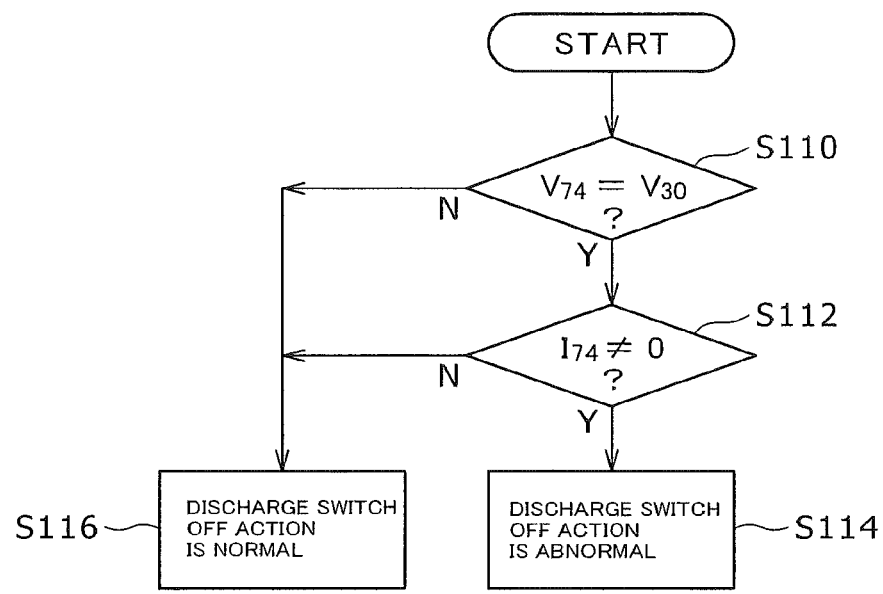
FIG. 17 is a flowchart showing procedural steps for determining the action of the discharge switch in the embodiment of the present invention.

FIG. 17 is a flowchart representing procedural steps for determining whether the off action of the discharge switch 74 is normal or abnormal in the startup self-diagnosis. Firstly, whether or not $V_{74}=V_{30}$, i.e. whether or not a voltage difference between both terminals of the discharge switch 74 is absent, is determined (S110). When NO is determined, the off action of the discharge switch 74 is normal (S116). When YES is determined, it is further determined whether or not $I_{74}$ exceeds the predetermined range, for example, whether or not $I_{74}$ is unequal to 0, i.e. whether a load current is passed through the discharge switch 74 (S112). Here, when NO is determined, i.e. when $I_{74}$ is in the predetermined range, for example, $I_{74}=0$, the off action of the discharge switch 74 is normal (S116). When YES is determined, i.e. when the load current is passed, the off action of the discharge switch 74 is determined for the first time to be abnormal (S114).

Thus, the off action of the discharge switch 74 can be determined to be abnormal only when both a condition that $V_{74} V_{30}$ and a condition that $I_{74}$ is unequal to 0 are satisfied. When compared to a case where the load side breaker 26 is installed, the above-described steps differ in additional use of the current detector for detecting $I_{74}$. Namely, although determination as to whether the off action of the discharge switch 74 is normal or abnormal can be performed using only the voltage detectors for detecting voltages of $V_{74}$ and $V_{30}$ when the load side breaker 26 is installed, the results detected by the current detectors should be additionally used to perform the determination when the load side breaker 26 is not installed.

In this connection, the procedural steps shown in FIG. 17 may be used even when the load side breaker 26 is installed. Although the number of steps is increased due to the presence of S112, the procedural steps can ensure prevention of erroneous determination. Accordingly, the procedural steps in FIG. 17 are preferably used regardless of the presence or absence of the load side breaker 26.

Still, when the load side breaker 26 exists, the procedural steps are redundant due to the presence of unnecessary step S112, and the unnecessary step S112 may be skipped according to selection by the user when the load side breaker 26 is included.

The off action of the discharge switch 74 can be determined to be normal only when the condition that $I_{74}$ is 0 and the condition that $V_{74}$ is unequal to $V_{30}$ are satisfied as described above. Thus, the procedural steps in FIG. 17 are applicable also when the load side breaker 26 exists.

Returning back to FIG. 16, in the periodic monitoring performed while the electrical storage system is running, whether the off action of the discharge switch 74 is normal or abnormal can be determined by monitoring a load current of $I_{74}$. Meanwhile, the on action of the discharge switch 74 can be determined to be normal, in the same way as described above, when the voltage difference between $V_{74}$ and $V_{30}$ obtained by comparing $V_{74}$ and $V_{30}$ detected in the voltage detectors lies within the predetermined range, and can be determined to be abnormal when the voltage difference exceeds the predetermined range.

As can be seen from a comparison between the diagnosis of the discharge switch action in the periodic monitoring during operation and the diagnosis of the discharge switch action in the startup self-diagnosis, the startup self diagnosis needs procedural steps which are different from those in the periodic monitoring during operation. Specifically, although it is possible to diagnose the action of the discharge switch 74 only using the results detected by the current detector in the case of the periodic monitoring during operation, a combination of the results detected by the voltage detector and the results detected by the current detector is used in the startup self-diagnosis, which can ensure that erroneous determination is prevented regardless of the configuration of the electrical storage system.

Next, details of the operation controlling apparatus 120 will be described with reference to FIGS. 18 to 22. The operation controlling apparatus 120 can function to set a standby state without causing both the load side breaker 26 and the electrical storage device breaker 50 to be put in the interrupted state when operation of the electrical storage system 10 is stopped. More specifically, the operation controlling apparatus 120 includes, as operation modes, the normal operation mode to perform actual control for charging or discharging in the electrical storage system 10 and the standby mode to prohibit the actual control for charging or discharging in the electrical storage system 10 but otherwise establish the same states as those in the normal operation mode.

Figure 18:
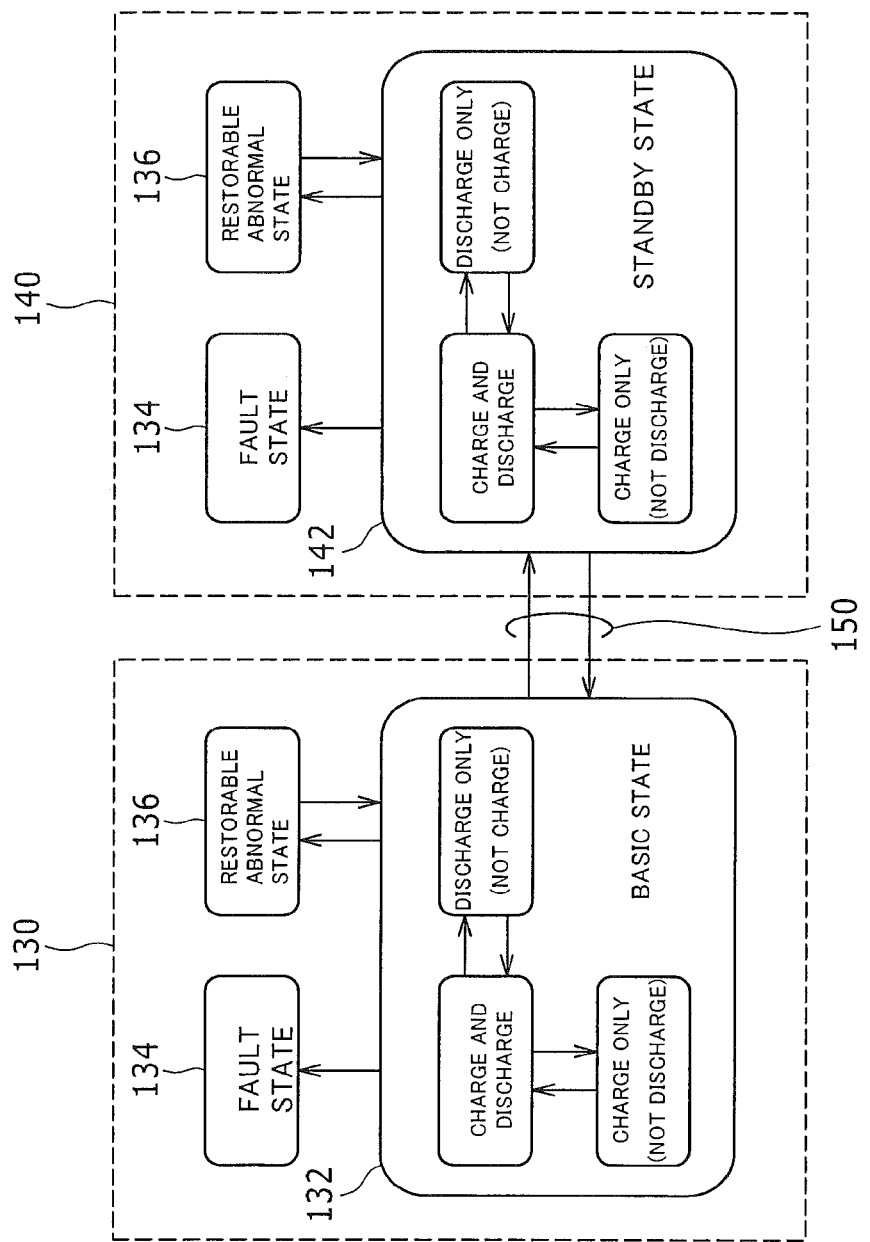
FIG. 18 is a diagram for explaining a normal operation mode and a standby mode in the embodiment of the present invention.

FIG. 18 is a diagram for explaining states in the normal operation mode 130, states in the standby mode 140, and a way of state transition 150. FIG. 19 shows requirements for setting the normal operation mode, and FIG. 20 shows requirements for setting the standby mode.

The states in the normal operation mode 130 include three states of a basic state 132, a fault state 134, and a restorable abnormal state 136. A state transition from the basic state 132 to the fault state 134 or to the restorable abnormal state 136 occurs when an abnormality is detected during the periodic monitoring performed by the periodic monitoring apparatus 110. Upon detection of the abnormality by the periodic monitoring apparatus 110, the abnormality is classified as either the fault state 134 or the restorable abnormal state 136 according to the classification criteria regarding the detected abnormality as shown in FIG. 14. Those classified as the fault state 134 are not returned to the basic state 132 without processing, whereas the restorable abnormal state 136 is restored to the basic state 132 when the abnormal state is fixed and returned back to a normal state.

In the basic state 132 of the normal operation mode 130 in FIG. 18, state transitions in the control for charging and discharging are indicated. Here, it is described that the state transitions occur among three states of a charge and discharge state for performing both charge and discharge, a discharge only state for solely performing discharge without charging, and a charge only state for solely performing charge without discharging. As a charged state of the electrical storage device 30, SOC may be used. For example, the charge and discharge state transitions to the discharge only state when SOC becomes 90% or higher, and transitions to the charge only state when SOC becomes smaller than 40%. The discharge only state transitions to the charge and discharge state when SOC becomes smaller than 60%, while the charge only state transitions to the charge and discharge state when SOC becomes 60% or higher. Although the electrical storage device 30 can be charged until SOC=100% by its nature, a nearly 100% charged state might lead to a shortened service life of the storage battery packs constituting the electrical storage device 30. For this reason, charging is performed, in this embodiment, until SOC=90% and stopped at SOC of 90% by setting the discharge only state. Similarly, because discharge performed until SOC approaches 0% also might shorten the service life of the battery packs, further discharging is disabled when SOC becomes smaller than 40% by setting the charge only state. Moreover, SOC close to 60%, which allows the battery packs to operate in the most efficient way, is specified as a threshold for transition to the charge and discharge state. The above description is provided by way of illustration, and requirements for the state transition may be established using SOC values other than those describe above.

The states in the standby mode 140 of FIG. 18 are almost identical to those in the normal operation mode 130, but different in that the basic state 132 in the normal operation mode 130 is changed to a standby state 142. On the other hand, the way of state transitions in the standby state 142 is the same as that of state transitions in the basic state 132 of the normal operation mode 130. Namely, the charge and discharge state transitions to the discharge only state when SOC becomes 90% or higher, and transitions to the charge only state when SOC becomes smaller than 40%. The discharge only state transitions to the charge and discharge state when SOC becomes smaller than 60%, while the charge only state transitions to the charge and discharge state when SOC becomes 60% or higher.

As described above, both in the basic state 132 of the normal operation mode 130 and in the standby state 142 of the standby mode 140, control is performed on the assumption that the states are caused to transition by the same SOC criteria. Note that in the basic state 132 of the normal operation mode 130, both control for charging and control for discharging are actually performed in the charge and discharge state, control for discharging is actually performed in the discharge only state, and control for charging is actually performed in the charge only state, while in the standby state 142 of the standby mode 140, both charging and discharging are prohibited in any state.

As a result, in the standby mode 140, the state is fixed at the SOC obtained when the operation mode is changed from the normal operation mode 130 to the standby mode 140. However, because the actual state of each component of the electrical storage system 10 is not necessarily always maintained in the fixed state, various state transitions could occur within a period of the standby mode 140. For example, assuming that the SOC is 61% at the time of switching to the standby mode 140, the discharge only state will be selected in the standby state 142. Here, when the SOC is decreased to less than 60% due to some cause within a continued period of the standby mode 140 of several hours, state transition to the charge and discharge state occurs. Then, when SOC is further decreased to less than 40%, the state transition to the charge only state occurs.

In the standby mode 140, although the action of the charge and discharge switch device 60 is prohibited as described above, the charged state of the electrical storage device 30 is continuously monitored, and the state transition is accordingly performed based on the monitored result. In this way, the state in the standby state 142 is transferred directly to the corresponding state in the basic state 132, and control for charging and discharging is immediately initiated based on the transferred state. In the above-described example, if state transition to the charge only state has occurred in the standby mode 142, control for charge only is immediately initiated corresponding to the present charge only state rather than corresponding to the discharge only state having been established at the time of switching to the standby mode 140.

FIG. 19 shows setting requirements used for setting the normal operation mode 130. According to the setting requirements, the operation mode of the electrical storage system 10 is set to the normal operation mode 130. The setting is carried out by the normal operation mode setting unit 122 in the operation controlling apparatus 120.

FIG. 20 shows setting requirements used for setting the standby mode 140. According to the setting requirements, the operation mode of the electrical storage system 10 is set to the standby mode 140. The setting is carried out by the standby mode setting unit 124 in the operation controlling apparatus 120.

In the standby mode 140, because both the charge switch 70 and the discharge switch 74 are turned off, it can be recognized that any action of the charge and discharge switch device 60 is prohibited during the period of the standby mode 140. Therefore, when the setting of the charge and discharge switch device 60 is changed between permission of control for charging and discharging and prohibition of control for charging and discharging, the state transition 150 between the normal operation mode 130 and the standby mode 140 is caused. The state transition 150 is carried out by the state transition unit 126 in the operation controlling apparatus 120.

In the standby mode 140, because neither of the load side breaker 26 and the electrical storage device breaker 50 is put into the interrupted state, restoration to the normal operation mode 130 can be easily achieved only by canceling prohibition of control for charging and discharging without the need for conducting the storage device breaker diagnosis and the load side breaker diagnosis in the startup self-diagnosis.

A specific example will be described below. When control for charging and discharging is performed on the electrical storage system 10 during daytime hours in which company offices are in operation, and activation of the electrical storage system 10 is stopped during night hours in which the offices are out of operation, an advantageous effect of saving the effort to interrupt both the electrical storage device breaker 50 and the load side breaker 26 and reset both of the electrical storage device breaker 50 and the load side breaker 26 to the connected state again on the following morning can be obtained.

In such a case, based on a predetermined charge and discharge schedule of the electrical storage system, a period distinguishing unit in the operation controlling apparatus 120 obtains a distinction between a normal operation period in which normal operation is performed and a charge and discharge stopped period in which charge and discharge are stopped. The state transition unit 126 can control the charge and discharge switch device 60 in such a manner that the charge and discharge switch device 60 is caused to transit from the normal operation mode 130 to the standby mode 140 when determined to be within the charge and discharge stopped period is obtained, and caused to transit from the standby mode 140 to the normal operation mode 130 when determined to be within the normal operation period is obtained.

Usage of the standby mode 140 includes, as another specific example, changing control parameter settings, when settings of control parameters used for controlling the action of the charge and discharge switch 60 are changed, so as to establish the charge and discharge switch 60 as the standby mode 140 without tripping the electrical storage breaker 50 and the load side breaker 26. In this way, after the setting change of the control parameters is finished, the normal operation mode 130 can be easily restored only by canceling prohibition of control for charging and discharging, to thereby enable operation using the newly set control parameters.

In such a case, a parameter setting unit that sets control parameters used for controlling the action of the charge and discharge switch device 60 may be permitted to change the settings of the control parameters, and when changing the settings of the control parameters is completed, state transition from the standby mode 140 to the normal operation mode 130 may be performed. Here, the parameter setting unit may be installed in the operation controlling apparatus 120.

Figure 21:
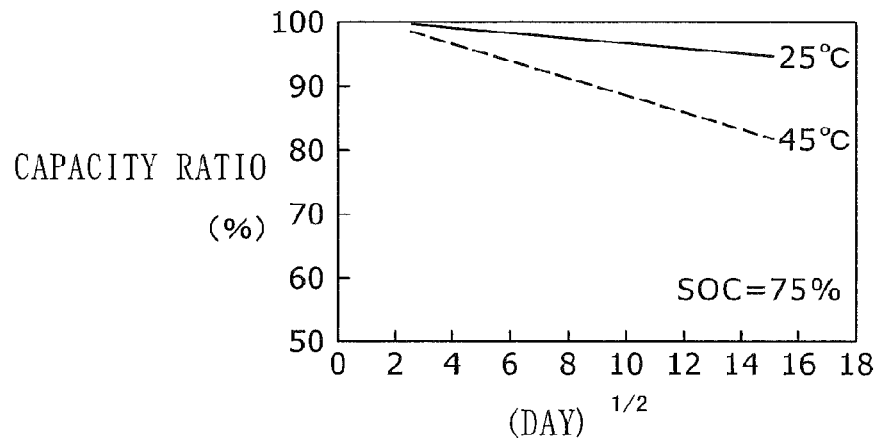
FIG. 21 is a diagram for explaining an effect of using the standby mode.
Figure 22:
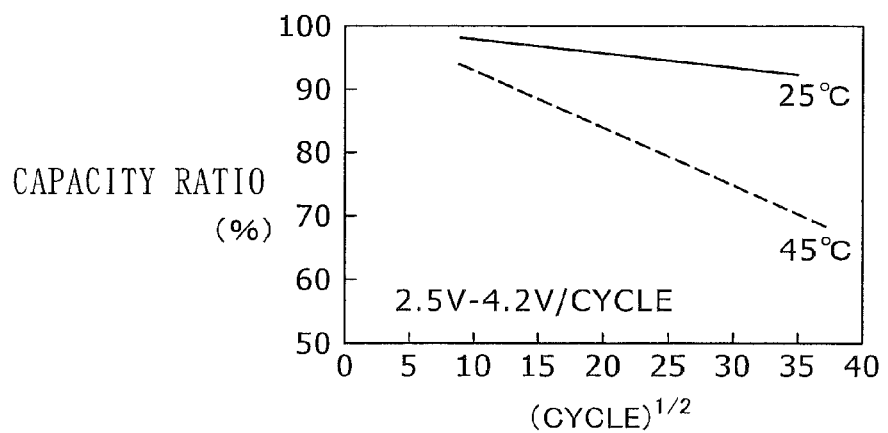
FIG. 22 is a diagram for explaining another effect of using the standby mode.

FIGS. 21 and 22 are diagrams for explaining effects of using the standby mode 140 in terms of performance of the electrical storage device 30. In the standby mode 140, charge and discharge control of the electrical storage device 30 is prohibited as described above, which can prevent the temperature of the electrical storage device 30 from being increased due to charge and discharge of the electrical storage device 30. As a result, ambient temperatures of the electrical storage device 30 become lower than those during operation. In this way, a longer service life of the electrical storage device 30 can be expected.

FIG. 21 is a diagram showing how the capacity of the electrical storage device 30 is decreased with respect to storage temperature of the electrical storage device 30 as storage time elapses. Here, SOC at an early storage stage is taken as 75%, and a decrease in capacity is indicated by a capacity ratio relative to the SOC of 75%. FIG. 21 is a diagram obtained by plotting the one-half power of the storage time on the abscissa and plotting the capacity ratio on the ordinate, in which, taking storage temperatures as 25° C. and 45° C., decreases of the capacity ratio at the storage temperatures are compared. As indicated in FIG. 21, it can be understand that the electrical storage device 30 undergoes, at a lower temperature, a smaller decrease in its capacity, and has a longer service life.

FIG. 22 shows a result of a charge and discharge cycling test. The abscissa shows the one-half power of the number of cycles, and the ordinate shows the capacity ratio. As indicated in FIG. 22, it can be understand that the electrical storage device 30 undergoes, at a lower test temperature, a smaller decrease in its capacity, and has a longer service life.

Here, the charge and discharge cycling test was conducted as described below. Specifically, test implementing temperatures were set to 25° C. and 45° C. Then, a charge and discharge condition was established such that, as a charge condition in a first cycle, after constant current charge was performed with a charge current of 50 mA for four hours, constant current charge was performed with a current of 20 mA until a battery voltage reached 4.20 V, and constant voltage charge was further performed at the voltage of 4.20 V until a current value reached 50 mA. Further, as a discharge condition in the first cycle, constant current discharge was performed with a current of 200 mA until the battery voltage reached 2.7 V. As a charging condition in cycles of from the second cycle to the 500-th cycle, constant current charge was performed with a current of 1000 mA, and constant voltage charge was further performed at the voltage of 4.20 V until the current value reached 50 mA. As a discharge condition in cycles of from the second cycle to the 500-th cycles, constant current discharge was performed with a current of 1000 mA until the battery voltage reached 2.75V. In this way, a relationship between the capacity ratio and the number of cycles was obtained.

INDUSTRIAL APPLICABILITY

The self-diagnostic apparatus for the electrical storage system according to the present invention may be used for electrical storage systems including a multiplicity of components in addition to the electrical storage device.

What is claimed is:

1. A self-diagnostic apparatus for an electrical storage system comprising an electrical storage device, a charge and discharge switch device disposed so as to be connected to the electrical storage device, and an electrical storage device breaker disposed between the electrical storage device and the charge and discharge switch device, the self-diagnostic apparatus comprising: at least one diagnosing unit for, when the electrical storage system is activated, diagnosing peripheral diagnostic items after the electrical storage device breaker is brought into an interrupted state; wherein the at least one diagnosing unit diagnoses the peripheral diagnostic items only when the electrical storage device breaker is brought into an interrupted state.

2. The self-diagnostic apparatus for the electrical storage system according to claim 1, further comprising:
a display unit for displaying that the electrical storage device breaker is configured to be brought into a connected state when a result of diagnosing the peripheral diagnostic items is normal.

3. The self-diagnostic apparatus for the electrical storage system according to claim 1, further comprising:
a usage state diagnosing unit for diagnosing the electrical storage apparatus in a usage state after the electrical storage breaker is brought into a connected state.

4. The self-diagnostic apparatus for the electrical storage system according to claim 3, wherein
the electrical storage system includes a load side breaker disposed between the charge and discharge switch device and an external load,
the self-diagnostic apparatus further comprises;
an initialization setting unit that initializes the electrical storage system,
a state monitoring unit for the electrical storage device breaker that monitors the connected state of the electrical storage device breaker, and
a state monitoring unit for the load side breaker that monitors a connected state of the load side breaker.

5. The self-diagnostic apparatus for the electrical storage device according to claim 4, wherein
the electrical storage system uses, as the power source, an external commercial power source, and
the peripheral item diagnosing unit includes a converter diagnosing unit for diagnosing whether or not an action of an AC/DC converter for converting alternating current power of the external commercial power source into a direct current power for charging is normal.

6. The self-diagnostic apparatus for the electrical storage system according to claim 4, wherein
the electrical storage system is connected to a photoelectric conversion module, and
the peripheral item diagnosing unit includes a switching device diagnosing unit for diagnosing whether or not an action of a switching device is normal, the switching device that changes a connected state of a plurality of photovoltaic power generation modules constituting the photoelectric conversion module to switch an output voltage and to change an output destination of the photoelectric conversion module.

7. The self-diagnostic apparatus for the electrical storage system according to claim 4, wherein
the usage state diagnosing unit includes an electrical storage device diagnosing unit that diagnoses whether or not a state of the electrical storage device is normal.

8. The self-diagnostic apparatus for the electrical storage system according to claim 7, further comprising:
a switch diagnosing unit that diagnoses whether or not an action of the charge and discharge switch device is normal in the connected state of the electrical storage device breaker when a result diagnosed by the electrical storage device diagnosing unit is normal.

9. The self-diagnostic apparatus for the electrical storage system according to claim 8, wherein
the switch diagnosing unit diagnoses, based on a voltage between both terminals of the charge and discharge switch device, whether or not an action of the charge and discharge switch device is normal.

10. The self-diagnostic apparatus for the electrical storage system according to claim 9, wherein
the charge and discharge switch device includes a discharge switch connectively disposed between the electrical storage device and the load to perform discharge from the electrical storage device to an external load; and the switch diagnosing unit
provides an off command to the discharge switch, and detects a voltage between both terminals of the discharge switch in response to the off command, determines the action of the discharge switch as being normal when the detected voltage between both terminals exceeds a predetermined range, further detects, when the detected voltage between both terminals lies within the predetermined range, a flow of a load current passed between the discharge switch and the load, and determines the action of the discharge switch as being normal when the load current is not detected, or determines the action of the discharge switch as being abnormal when the load current is detected.

* * * * *